United States Patent [19]
Perry et al.

[11] Patent Number: 5,557,669
[45] Date of Patent: Sep. 17, 1996

[54] CHANNEL INTERFACE UNIT

[75] Inventors: Steven B. Perry, Perrineville, N.J.; James P. Hogan, Sterling, Va.

[73] Assignee: ANTEC Corporation, Rolling Meadows, Ill.

[21] Appl. No.: 135,023

[22] Filed: Oct. 12, 1993

Related U.S. Application Data

[62] Division of Ser. No. 28,884, Mar. 10, 1993.

[51] Int. Cl.[6] .................................................. H04M 3/22
[52] U.S. Cl. ........................... 379/339; 379/39; 379/347; 379/399; 379/398
[58] Field of Search ..................................... 379/324, 338, 379/339, 340, 344, 345, 347, 398, 399, 400, 401, 402, 403, 404, 405, 406, 412, 413, 39

[56] References Cited

U.S. PATENT DOCUMENTS

| | | | |
|---|---|---|---|
| 4,287,393 | 9/1981 | Reuvekamp | 379/413 |
| 4,398,143 | 8/1983 | Bonis | 323/370 |
| 4,476,350 | 10/1984 | Aull et al. | 379/382 |
| 4,563,547 | 1/1986 | Booth | 379/342 |
| 4,636,584 | 1/1987 | Binkerd et al. | 379/240 |
| 4,677,669 | 6/1987 | Kawami et al. | 379/413 |
| 4,852,160 | 7/1989 | Kiko et al. | 379/405 |
| 4,961,218 | 10/1990 | Kiko | 379/347 |
| 4,993,063 | 2/1991 | Kiko | 379/405 |
| 5,202,919 | 4/1993 | Kiko | 379/399 |

OTHER PUBLICATIONS

"MCU–4200 D4/SLC–96 Metallic Channel Unit (For Alarm CKTS.)", *Operation and Installation Practice Manual*, Practice Section TLGD–4200, Tollgrade Communications, Inc. (Jan. 1992) pp. 1–7.

"MCU–4496 SLC–96 Metallic Channel Unit", *Draft Operation and Installation Practice Manual*, Practice Section TLGD–MCU–4496, Rev A, Tollgrade Communications, Inc. (Jul., 1990), pp. 1–6.

"MCU–4200 D4/SLC–96 Metallic Channel Unit", *Draft Operation and Installation Practice Manual*, Practice Section TLGD–MCU–4200, Rev A, Tollgrade Communications, Inc. (Jul., 1990), pp. 1–11.

"Tollgrade Communications MCU–4400 D4 Metallic Channel Unit", *Draft Operation and Installation Practice Manual*, Practice Section TLGD–MCU–4400, Rev. A (Jul., 1990), pp. 1–8.

Primary Examiner—Jeffery Hofsass
Assistant Examiner—Daniel S. Hunter
Attorney, Agent, or Firm—Michaelson & Wallace; Peter L. Michaelson; John C. Pokotylo

[57] ABSTRACT

A channel interface unit for interconnecting a two-wire transmission path which transmits analog signals and a digital signal transmission path. The channel interface unit includes a digital interface unit coupled with the digital signal transmission path and producing digital signals based on digital signals received from the digital signal transmission path, a converter for converting the digital signals to analog signals, a filter for removing noise, produced by the converter, from the analog signals, a driver, coupled with the two-wire transmission path, for amplifying the filtered analog signals, and a power supply for providing regulated voltage to the driver.

32 Claims, 13 Drawing Sheets

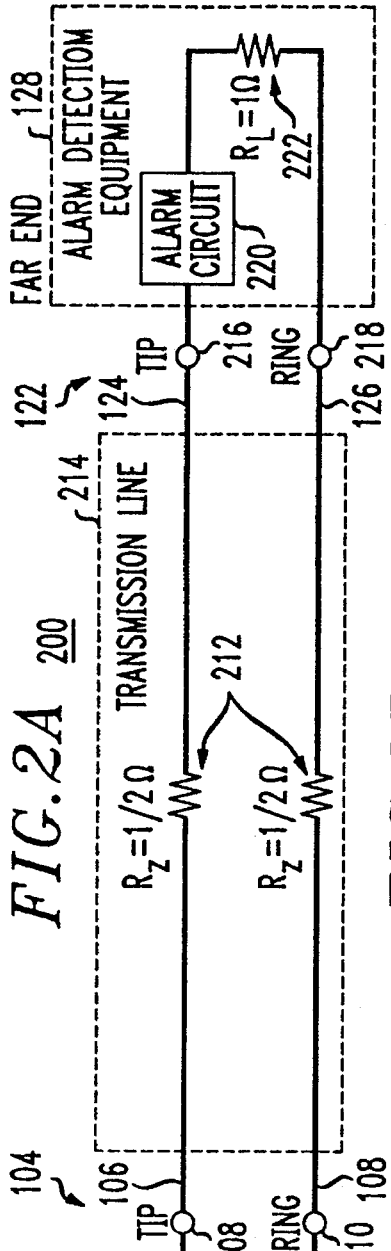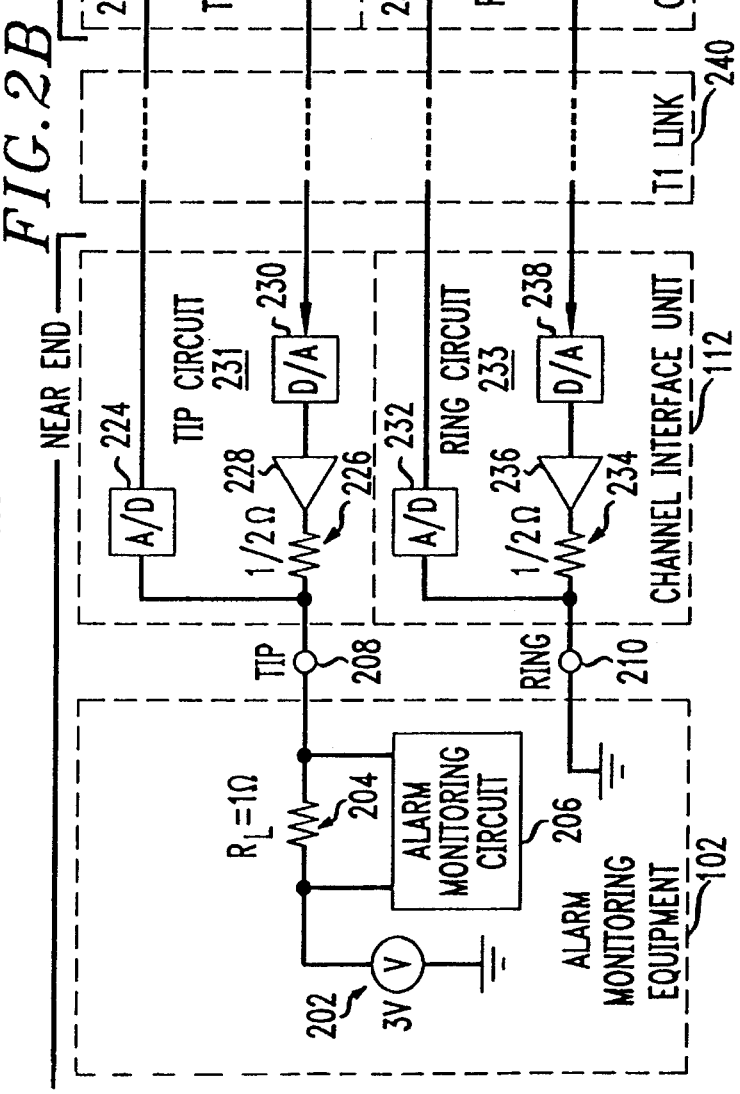
FIG. 2A
FIG. 2B

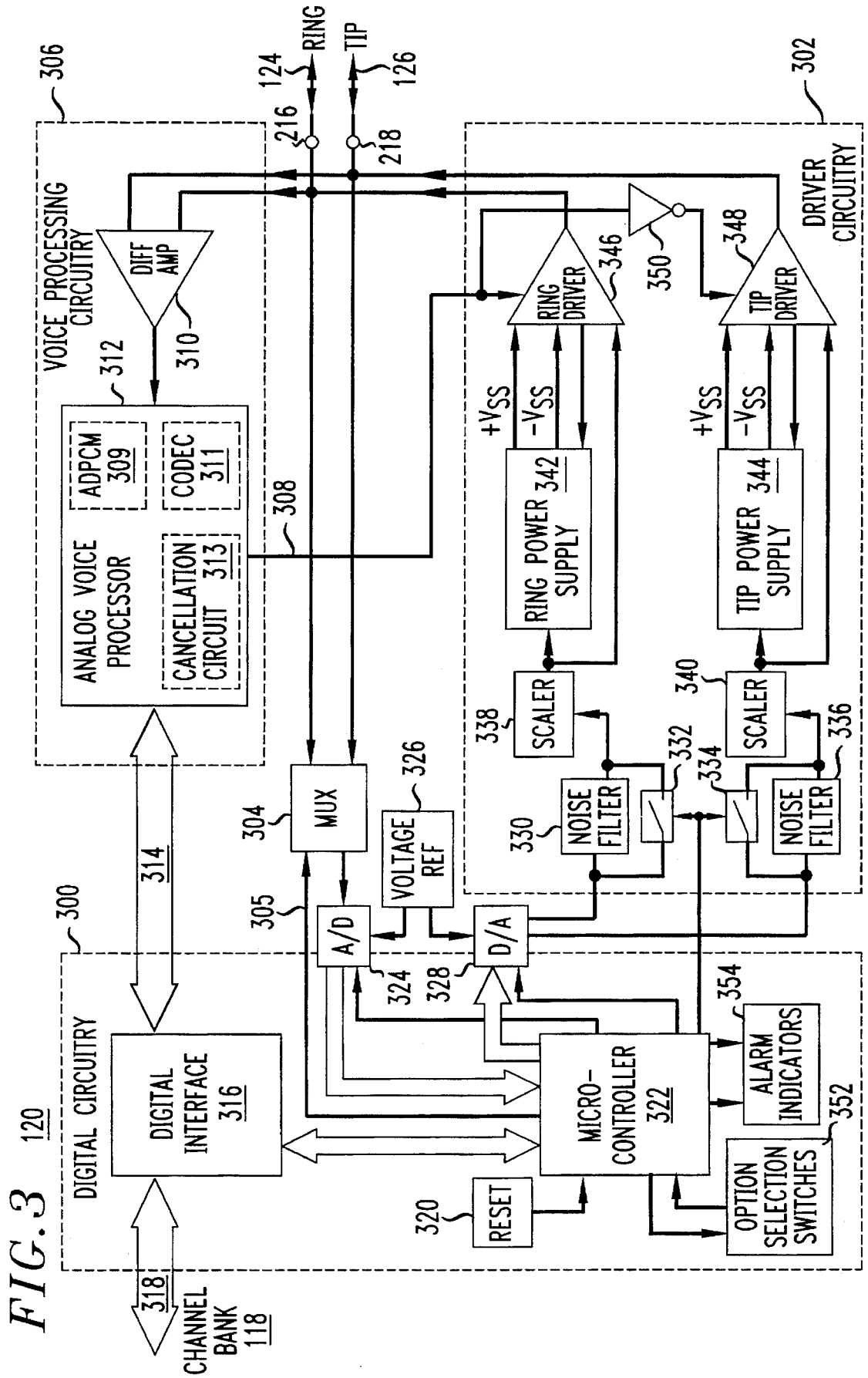

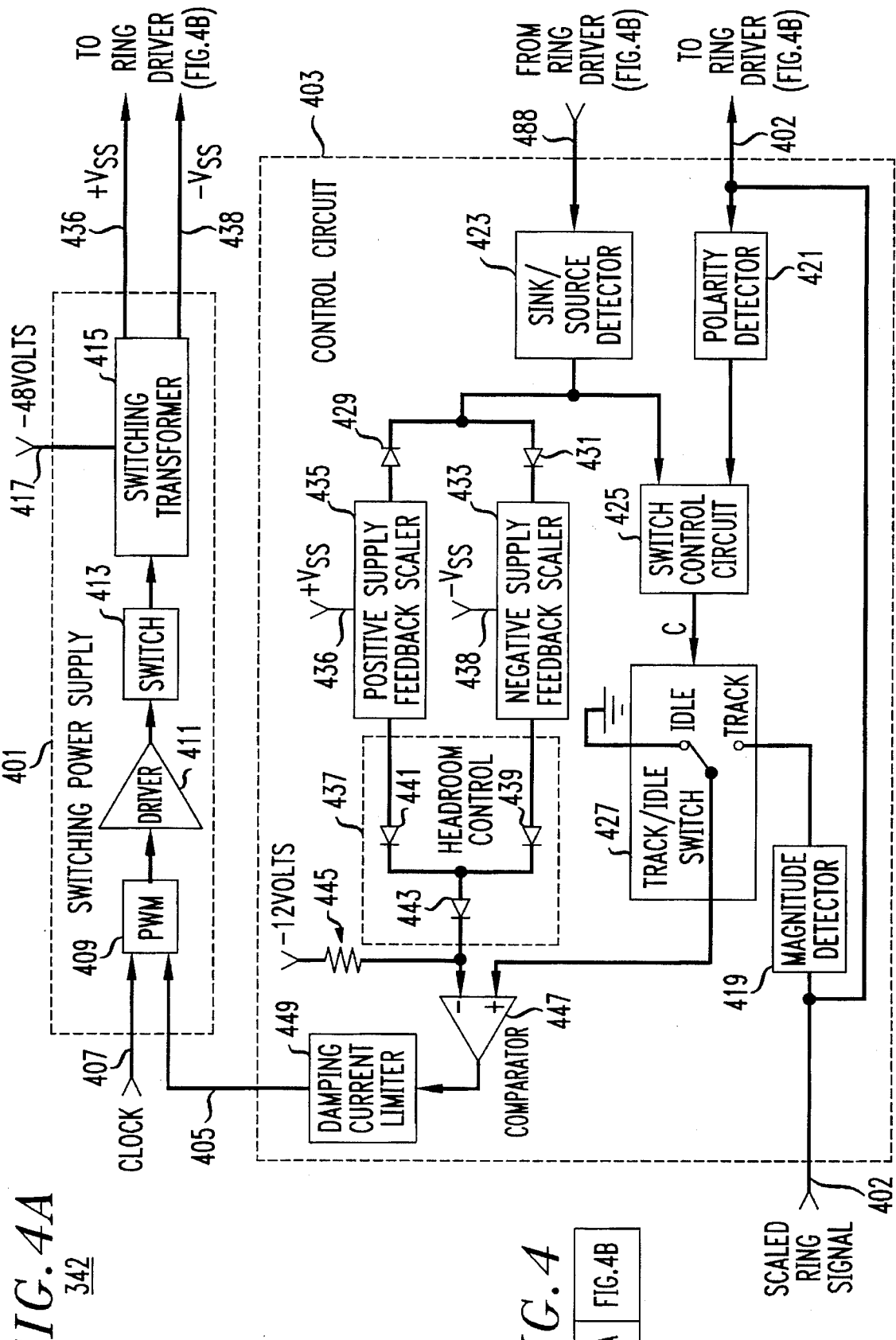

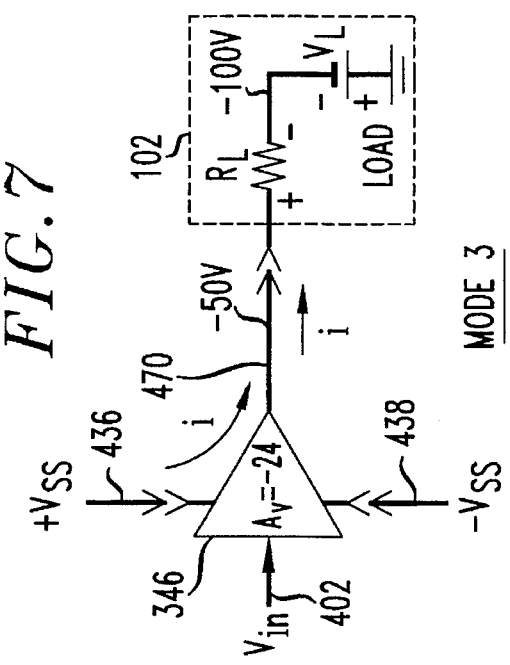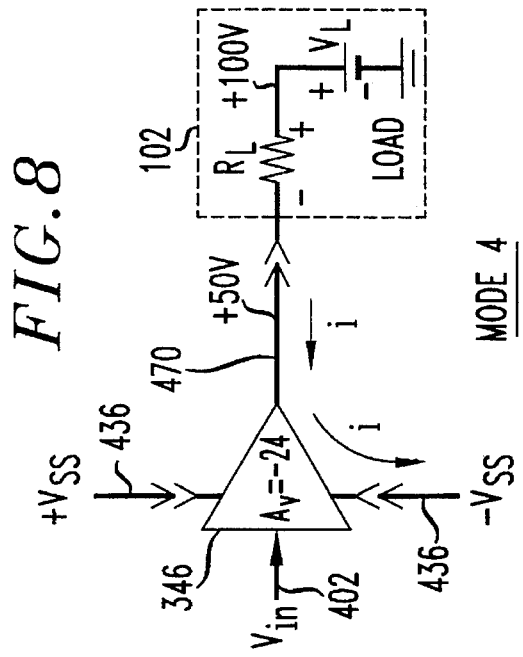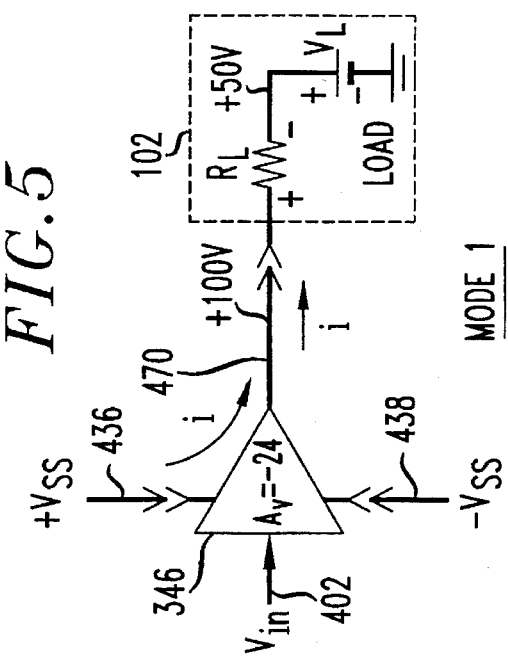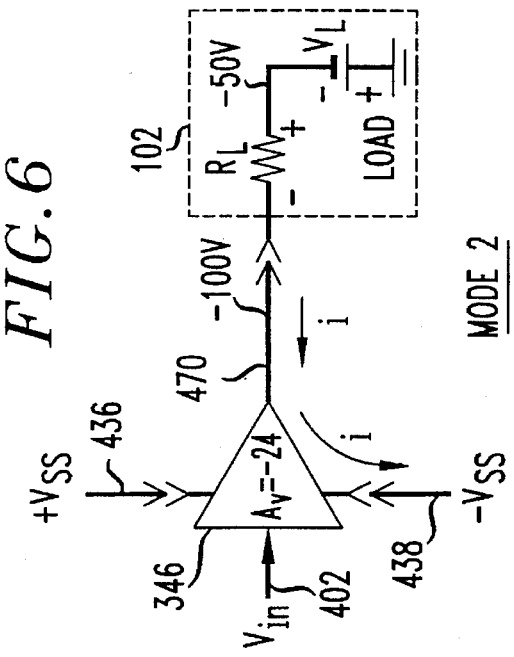

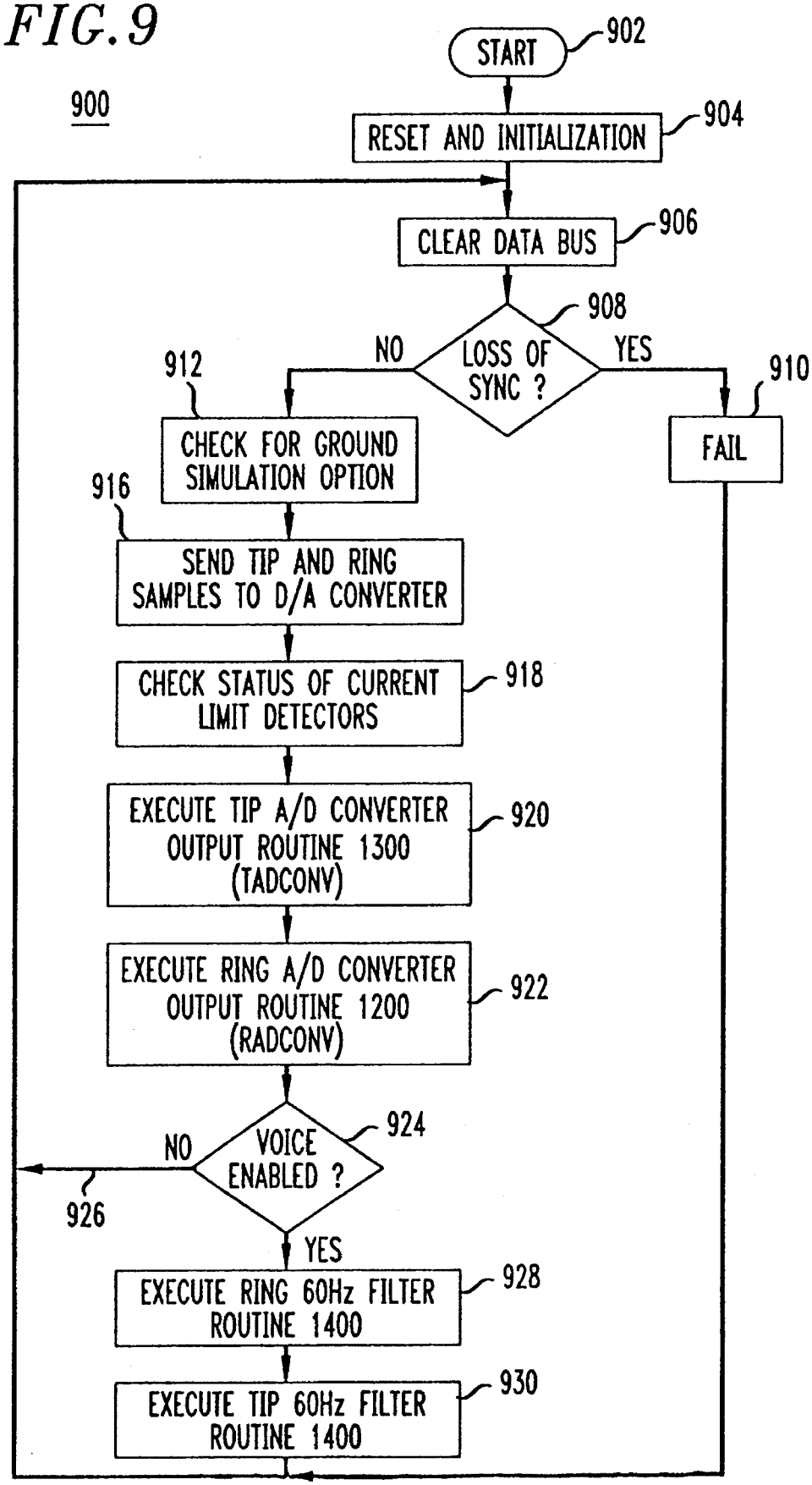

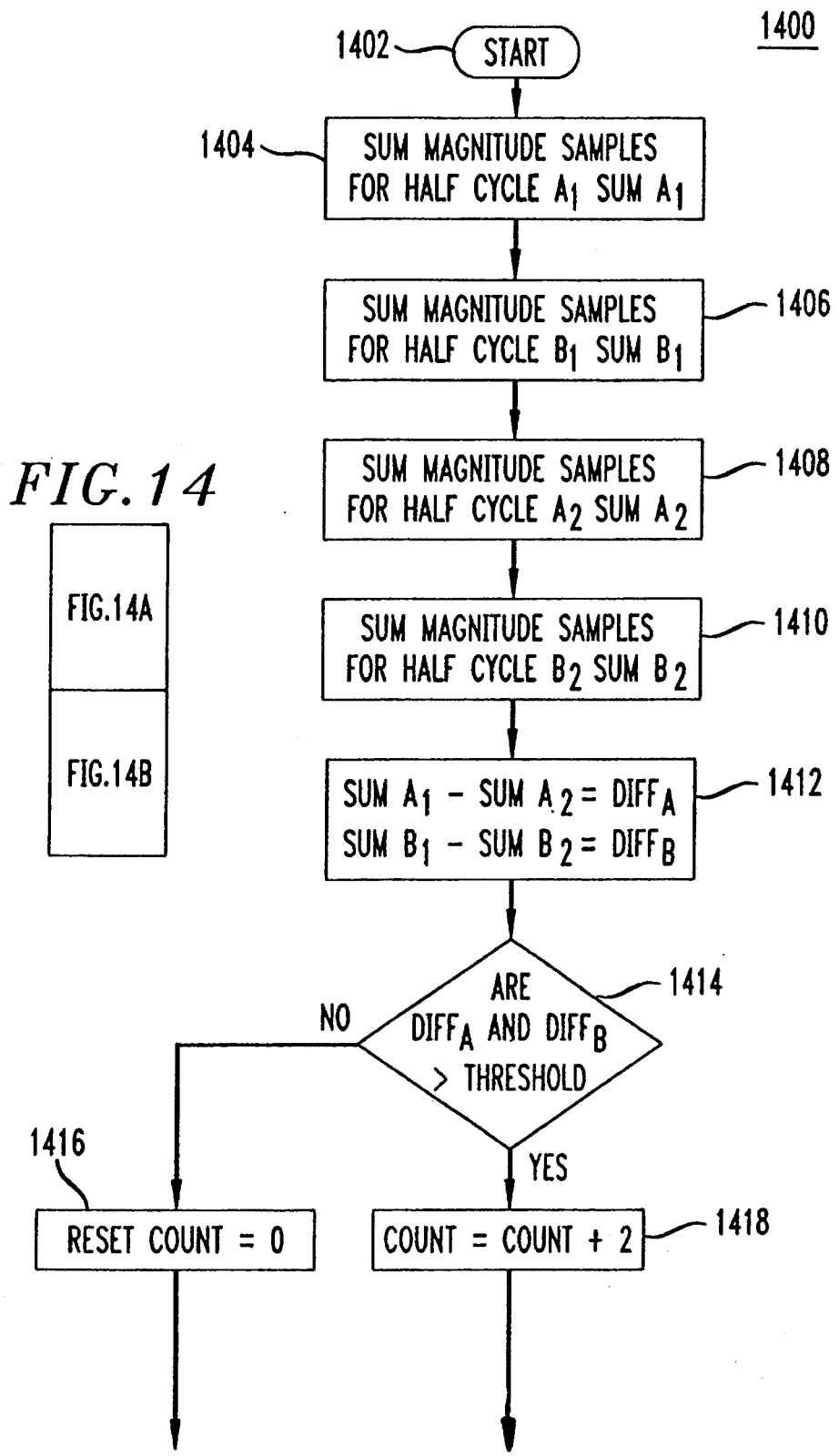

CHANNEL INTERFACE UNIT

CROSS-REFERENCE TO RELATED APPLICATIONS

This application is a divisional patent application of our copending parent U.S. patent application "CHANNEL INTERFACE UNIT", filed Mar. 10, 1993 and accorded Ser. No. 08/028,884.

This patent application describes and claims subject matter that is also described in the co-pending U.S. patent application "CHANNEL INTERFACE UNIT", Ser. No. 08/135,025, filed simultaneously herewith, which is a divisional patent application of our co-pending parent U.S. patent application identified above.

BACKGROUND OF THE DISCLOSURE

1. Field of the Invention

The invention relates to communication systems, and more particularly, to a channel interface unit for connecting a two-wire transmission path to a four-wire transmission path whereby all direct current (DC), low frequency and voice band signals typically carried by a two-wire analog transmission path are propagated along a four-wire digital transmission path.

2. Description of the Prior Art

Typically, telephone companies lease two-wire transmission lines to customers for use as dedicated communications and/or signaling paths between customer sites located at distant geographic locations. Customers, such as utilities, use such paths for transmitting telemetry; water, gas, and sewage flow rates; power grid monitoring signals; and signals for control of remote transmitters. Additionally, alarm companies use such two-wire transmission paths for alarm signaling between customer locations and the alarm company premises. Each two-wire transmission path is generally a two-wire transmission line contained within a large multiconductor cable. The dedicated two-wire transmission lines carry various signal formats including direct current (DC) and/or low frequency (<200 Hz) analog signals and voice band signals (200 Hz–3.4 KHz). However, recently, to increase the number of voice and data transmissions over a single cable as well as to increase services while reducing maintenance costs, telephone companies have been converting existing multiconductor cables to fiber optic cables and other high speed transmission media which carry digital transmissions, i.e., digital transmission facilities. Such digital transmission facilities are only capable of transmitting voice band signals (200 Hz–3.4 KHz). Therefore, only customer systems that utilize voice band signals are compatible with these digital transmission facilities. Additionally, telephone companies have not been adding new dedicated metallic cables for customer use. As such, if a customer desires to expand its signaling capability, the customer must purchase new equipment capable of transmitting voice band signals through digital transmission facilities.

One specific illustrative customer use for a two-wire transmission line is to transmit alarm signals between distant customer sites and an alarm company premise. Typically, burglar and fire alarm companies lease two-wire transmission lines from telephone companies to connect alarm-monitoring equipment to alarm-detection equipment. The alarm-monitoring equipment is typically located in a monitoring office at the alarm company premises; the alarm-detection equipment is typically located at a customer premise. Usually, the customer premises and the monitoring office are geographically distant. The two-wire transmission line carries the alarm detection signaling, typically a direct current (DC) or low frequency analog signal. However, for some applications, voice band signals are also transmitted along with a DC signal.

Many burglar and fire alarm systems produce alarm signals that are simply not compatible with existing digital carrier systems, i.e., the alarm signals are typically DC or low frequency signals (out of the voice band) and digital carrier systems only respond to voice band signaling. Specifically, the alarm signals are not compatible with the digital channel units which form a typical interface between a customer and the digital carrier system. At present, there are at least fifty different alarm techniques which are utilized in signaling alarm conditions over two-wire transmission lines. Only a small number of these techniques are compatible with existing digital channel units, i.e., techniques that utilize voice band signals only. While some alarm companies have adapted their particular alarm signals to operate with existing digital channel units, this approach detrimentally requires alarm companies, producers of alarm equipment or telephone company subscribers to replace existing equipment with special equipment designed for use with each individual alarm signaling technique. Such an approach is costly and sometimes complicated.

A number of attempts have been made at developing interface equipment which provides compatibility amongst a number of alarm signaling techniques and existing digital carrier systems. In such a system, the digital carrier system contains a far end and a near end which are connected to one another by a digital transmission path, typically a T1 link. At each end of the digital transmission path is a channel bank containing channel units for formatting customer signals before transmission on the digital transmission path. To interface an alarm signal produced by a particular alarm signaling technique to the digital transmission path, a channel unit within each channel bank is replaced with interface equipment capable of formatting an alarm signal into a digital signal for transmission on a digital transmission path. Typically, the interface equipment, at a near end location, replaces an existing channel unit in the near end channel bank. In operation, the interface equipment digitizes all DC, low frequency and voice band alarm signals, formats the digitized signals into a 64 Kbps channel and inserts that channel into an appropriate time-slot within a digital carrier produced by the channel bank. At a far end location, corresponding interface equipment within a far end channel bank receives the digitized signal and converts the signal to an analog signal resembling the original DC, low frequency and voice band alarm signals that were digitized at the near end. Any response signal generated by the alarm equipment at the far end is digitized and transmitted by the interface equipment at the far end to the near end. In this manner, full duplex transmission of analog signals including low frequency, e.g., <200 Hz and DC, can be achieved over a digital carrier system. Such interface equipment is disclosed in two patents, both of which are entitled "Channel Unit Interface Circuit" and are issued to F. J. Kiko (U.S. Pat. Nos. 4,993,063 issued Feb. 12, 1991 and 4,852,160 issued Jul. 25, 1991), both of which are herein incorporated by reference.

Two measures of operation of the interface equipment described above are DC accuracy, known in the art as DC leakage, and conversion delay, known in the art as effective capacitance. All possible anomalies that affect the DC accuracy of the interface equipment are included in the definition of DC leakage. Such anomalies include quantization error, digital-to-analog (D/A) and analog-to-digital (A/D) conversion errors, transmission errors and interface equipment non-linearities. To accurately reproduce DC and low frequency alarm signals, these anomalies must be minimized or eliminated. On the other hand, effective capacitance is a measure of how quickly a change in signal level at the input of the interface equipment at the near end of the transmission path is reflected at the output of the far end interface equipment and vice versa. In other words, effective capacitance is a measure of end-to-end system response time.

Many alarm techniques utilize exceedingly small signals, i.e., on the order of a few milliamps of differential change in a quiescent current in the two-wire transmission lines, to indicate an alarm condition or for remote testing the alarm detection equipment. To detect such small changes on long two-wire transmission lines, the alarm monitoring circuitry must be very sensitive to such changes. To effectively reproduce these small changes in current when using interface equipment, the DC leakage of the interface equipment must be minimized to a fraction of these changes. If the DC leakage is not appropriately minimized, the sensitivity of the alarm equipment will be compromised and false alarms may result. Present interface equipment is generally not accurate enough to reliably transmit and receive DC and low frequency signals used in conjunction with this sensitive form of alarm equipment. Thus, users of sensitive alarm equipment must continue to rely upon two-wire transmission lines to connect the alarm detection equipment to the alarm monitoring equipment. However, as two-wire transmission lines are replaced with digital transmission facilities, owners of such sensitive alarm equipment will be required to replace their existing equipment with equipment that is compatible with digital transmission facilities.

Moreover, many alarm systems expect the end-to-end response time of a link between the alarm detection equipment and the alarm monitoring equipment to be at least as fast as the response time of the same system using two-wire transmission lines. As such, interface equipment must provide an end-to-end response time that at least approaches the speed of the two-wire transmission line which the interface equipment replaces. To improve system response time, the interface equipment must function with minimal signal processing overhead. Signal processing overhead refers to the time required for a system to process information, such as synchronization and timing information, that is generally unrelated to signal reproduction per se. Present interface equipment does not respond nearly as fast as many alarm systems require. As a result, the alarm systems which require fast response time are relegated to using only two-wire transmission lines between the alarm detection equipment and the alarm monitoring equipment. Thus, a need exists for interface equipment that has relatively low DC leakage and effective capacitance such that the interface equipment is compatible with substantially all uses of two-wire transmission lines.

Additionally, to accurately reproduce the analog signals, the interface equipment must both sink and source current from/to the two-wire transmission lines. When sinking current, the current must be absorbed (dissipated as heat) by the interface equipment or, as in some interface equipment, be transferred into a channel bank power supply from which the interface equipment draws its power. Moreover, since all the channel units within a channel bank are connected to a common power bus, the current from the channel equipment may be transferred to other channel units as well as the channel bank power supply. Using the channel bank power supply or other channel units within the channel bank as a current sink can detrimentally effect the operation of the entire channel bank. In that regard, channel banks are not designed to absorb power from the interface equipment installed therein and any such demand on the channel bank can, for example, cause current limiting devices to malfunction. Such malfunction can present a safety hazard to channel bank service personnel or to the channel bank equipment itself.

To avoid causing the channel bank power supply to sink current, some prior art interface equipment absorb that current by dissipating it as heat. However, such interface equipment is exceedingly inefficient and, as such, the heat dissipation of the interface equipment raises the internal operating temperature of the channel bank and wastes power which limits the number of channel units which can be installed in the channel bank along with the interface equipment. Thus, a need exists for interface equipment that is efficient and that does not require the channel bank to sink current.

Additionally, in another application where telephone companies maintain two-wire transmission lines, a pair of two-wire transmission lines is used by a telephone company itself to communicate with and test, telephone lines connected to remotely located switching gear. However, with the advent of digital carrier systems, it would be advantageous for the telephone company to be able to propagate the test signals over a digital link rather than a metallic pair of two-wire transmission lines. As a result of using a digital link, installation or maintenance of a dedicated pair of wire lines would not be required. Thus, a need exists in the art for interface equipment to connect test equipment located at both ends of a traditional pair of two-wire transmission lines via a digital carrier system. Typically, the test equipment used is sensitive to relatively small signal changes carried by each of the two-wire transmission lines. Moreover, test signals and responses to those test signals occur at very high speeds. Therefore, to accomplish the interface between the test equipment and the digital carrier system, interface equipment having a relatively low DC leakage and a relatively low effective capacitance is absolutely necessary to preserve test accuracy. Previous attempts at such interface equipment have had limited application because of excess DC leakage and effective capacitance of the interface equipment.

Thus, a need exists in the art for interface equipment, specifically a channel interface unit, which is compatible with substantially all of the different alarm signaling techniques and other uses for two-wire transmission lines. Such a channel interface unit must have a low DC leakage and effective capacitance. Additionally, the channel unit must be adaptable to test remotely connected telephone lines connected through digital carrier systems. Also, the channel interface unit must not sink current to a channel bank power supply from which the channel interface unit receives its power or sink current to other channel units within the channel bank. Moreover, the channel interface unit should not operate inefficiently.

SUMMARY OF THE INVENTION

Our invention advantageously overcomes the deficiencies heretofore associated with interconnecting a two-wire metallic transmission path to a four-wire digital transmission path. In particular, two of our inventive channel interface units, operating respectively at a far end and a near end of a communications system, digitize DC and AC signals carried by a two-wire transmission path at the far end, transmit the digitized signals along a T1 digital link to the near end, convert the digitized signals into analog signals that are representative of the DC and AC signals digitized at the far end, and apply the analog signals to a two-wire transmission path at the near end, and similarly for the reverse direction. By using our inventive channel interface units at each end of a digital transmission path, the digital path is virtually transparent to any equipment connected to the two-wire transmission paths at either end of the communications system.

Specifically, in accordance with the present invention, our inventive channel interface unit is connected to a two-wire transmission path and a four-wire digital transmission path. Typically, the two-wire transmission path is a metallic pair formed of a tip wire and a ring wire. The tip wire carries a tip signal and a ring wire carries a ring signal. A multiplexer, connected to the tip and ring wires, multiplexes the tip and ring signals to form a multiplexed signal. An analog-to-digital (A/D) converter periodically samples and digitizes the multiplexed signal such that the A/D converter produces interleaved twelve-bit digital tip signal samples and digital ring signal samples (hereinafter referred to as DC data).

Simultaneous with the digitization of the tip and ring signals, our inventive channel interface unit periodically digitizes a differential voice signal appearing across the tip and ring wires. The digitized voice signal (hereinafter referred to as voice data) is compressed to 3-bits for each signal sample.

The channel interface unit creates an 8-bit byte by forming a word composed of 4 bits of DC data, 3 bits of voice data and a framing bit for transmission onto the four-wire transmission path. The channel interface unit inserts, via a channel bank, the 8-bit byte into a channel in a frame of a T1 link, i.e., the four-wire transmission path. To transmit a full 12-bit tip and ring sample, six consecutive frames each having one channel of data are used. The channel bank transmits a particular channel within a sequence of frames every 125 μsec. Thus, a transmission of six frames onto the T1 link is completed every 750 μsec. Such a transmission speed, e.g., DC data and voice data every 750 μsec, is adequate for most any application of a channel interface unit. Additionally, 12-bits of DC accuracy produces a very low leakage resistance due to a relatively small quantization error.

Upon reception of six bytes of data in six frames from the far end channel interface unit, the near end channel interface unit synchronizes to the six framing bits and reconstructs the tip, ring and voice signals previously digitized at the far end of the T1 link. The channel interface unit separates the voice data from the DC data and processes each separately. Once decompressed and digital-to-analog (D/A) converted, the channel interface unit applies the voice signal to tip and ring wires. The DC data is separately D/A converted to produce both tip and ring signals from the 12-bit DC data respectively representing each signal. These signals are then amplified by a respective tip or ring driver, to a level that corresponds to that which was digitized in the far end channel interface unit.

Each driver has a corresponding power supply which controls the voltage applied to each driver to efficiently generate a desired output current and voltage. Generally, this control is accomplished by generating a power supply voltage that continuously tracks (a tracking mode) the output of the driver such that the power supply voltages applied to each driver only exceed the output voltage of each driver by a preset voltage. Thus, circuitry comprising each driver need only drop a fixed voltage equivalent to the preset voltage. Typically, the preset voltage is a voltage which provides an adequate working potential for a particular type of circuit design used in the drivers. Alternatively, under conditions where an excessively large voltage drop would be generated across the driver if the tracking mode were maintained, each power supply switches to an idle mode wherein only the preset voltage is applied to each driver thus reducing the voltage drop across the circuitry comprising each driver. In this manner, the channel bank power supply from which the channel interface unit derives all its power is not overloaded, reverse biased or required to sink power when the channel bank power supply was only designed to source power; hence, our inventive channel unit operates very efficiently.

In accordance with various features of our invention, our channel interface unit provides a number of optional operating modes and circuit configurations to facilitate use in a large number of possible applications. Specifically, our channel interface unit provides a transmit only option, a voice/no voice option, a ground simulation option and an increased driver output impedance option. The transmit only option is useful for applications that require only a capability to transmit onto the T1 link. The voice/no voice option enables a user to select whether or not voice signals are to be digitized for transmission onto the T1 link. The ground simulation option enables the channel interface unit to be configured for use in customer applications that connect one end of the two-wire transmission path to ground. The increased driver output impedance option permits a user to select an increased driver output impedance that will result in an increased end-to-end response time for a communication system using the channel interface unit.

Additionally, another feature of our channel interface unit enables optional circuit configurations to be implemented to utilize more than one channel in a T1 frame to reduce the effective capacitance of the channel interface unit. Furthermore, to further reduce the effective capacitance of the channel interface unit positive feedback can be included in each driver.

BRIEF DESCRIPTION OF THE DRAWINGS

The teachings of the present invention can be readily understood by considering the following detailed description in conjunction with the accompanying drawings, in which:

FIG. 2A depicts a simple model of illustrative alarm system 200 containing near end alarm monitoring equipment 102, two-wire transmission line 214 connected, at a near end, to the near end alarm monitoring equipment, and far end alarm detection equipment 128 connected to a far end of the two-wire transmission line;

FIG. 2B depicts the model in FIG. 2A having the transmission line replaced with T1 link 240 and a pair of channel interface units 112 and 120;

FIG. 3 depicts a high level block diagram of channel interface unit 120 shown in FIG. 2B;

FIG. 4 depicts the proper arrangement of FIGS. 4A and 4B;

FIG. 4A depicts a detailed block diagram of ring power supply 342 shown in FIG. 3;

FIG. 5 depicts a block diagram of driver 346 shown in FIG. 3 operating in a first mode of operation wherein the positive power supply must source current into load 102 while the driver maintains an output having a positive potential;

FIG. 6 depicts a block diagram of driver 346 shown in FIG. 3 operating in a second mode of operation wherein the negative power supply must sink current from load 102 while the driver maintains an output having a negative potential;

FIG. 7 depicts a block diagram of driver 346 shown in FIG. 3 operating in a third mode of operation wherein the positive power supply must source current into load 102 while the driver maintains an output having a negative potential;

FIG. 8 depicts a block diagram of driver 346 shown in FIG. 3 operating in a fourth mode of operation wherein the negative power supply must sink current from load 102 while the driver maintains an output having a positive potential;

FIG. 9 depicts a flow chart of MAIN LOOP routine 900 executing within microcontroller 322 shown in FIG. 3;

FIG. 14 shows the proper arrangement of FIGS. 14A and 14B;

FIG. 14A and 14B together depict a flow chart of 60 Hz filter routine 1400 executing within microcontroller 322 shown in FIG. 3.

To facilitate understanding, identical reference numerals have been used, where possible, to designate identical elements that are common to the figures.

DETAILED DESCRIPTION

After considering the following description, those skilled in the art will clearly realize that the teachings of our invention can be readily utilized to interface a two-wire transmission path to a digital telecommunications facility. Our invention is adaptable for use with any digital telecommunications facility as a circuit card, or cards, in any of the many channel banks currently used in the art. For example, our invention can be easily installed in a D4 channel bank as a single circuit card replacing a conventional channel unit. Additionally, with only minor modifications, our invention can be used in SLC-96 or SLC series 5 channel banks. For purposes of brevity, our invention will be described in the context of a D4 channel bank. Nonetheless, from the following description, the many uses of our invention will be apparent to those skilled in the art.

A. Overall System

Figure 1:
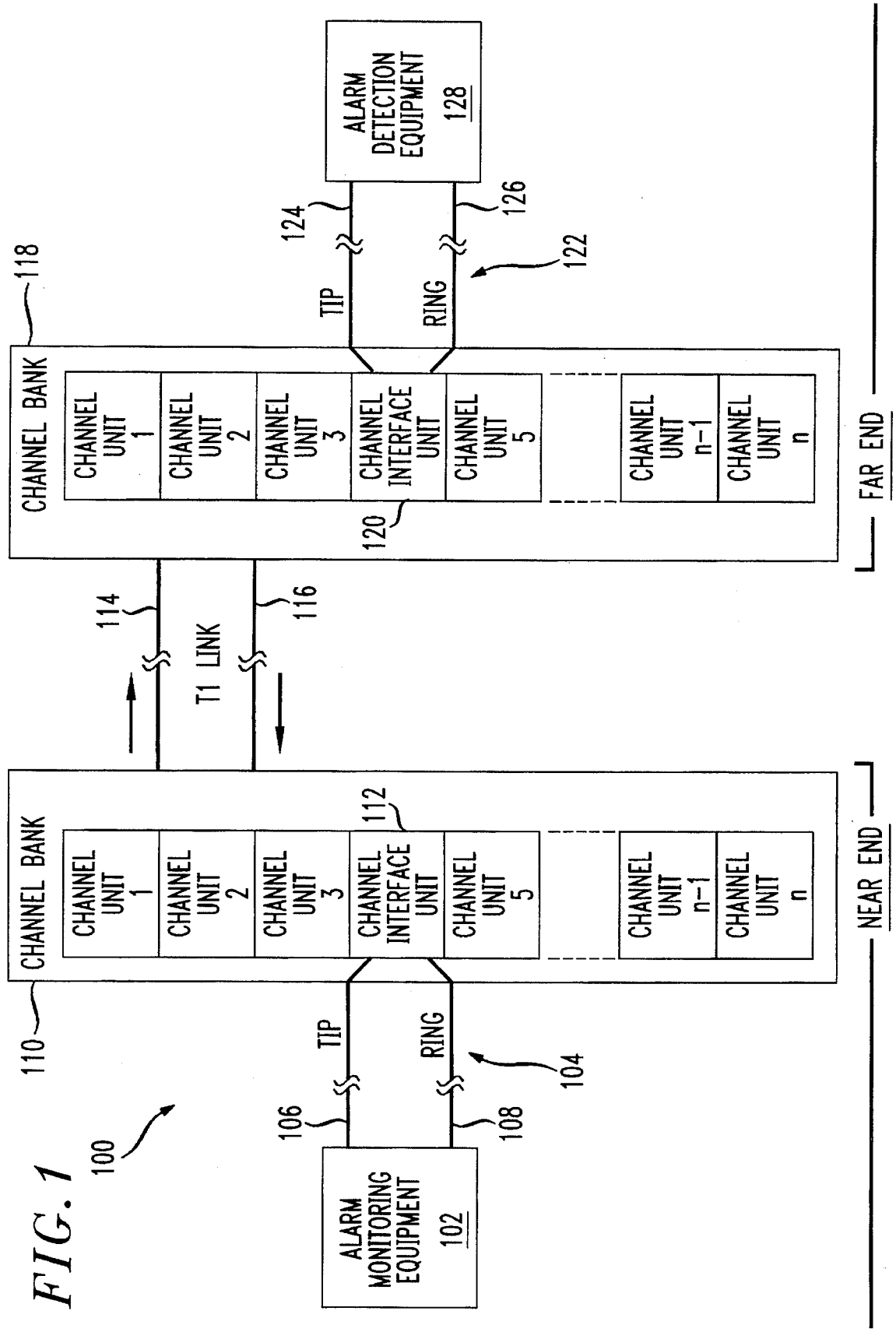
FIG. 1 depicts a block diagram of our inventive channel interface units 112 and 120 operating in telecommunications system 100.

FIG. 1 depicts a block diagram of our inventive channel interface unit being used in illustrative telecommunications system 100. System 100 comprises near end channel bank 110 connected, by T1 links 114 and 116, to far end channel bank 118. Alarm monitoring equipment 102 communicates, via system 100, with distantly located alarm detection equipment 128. Specifically, wire pair 104 contains wires 106 and 108, specifically shown as tip wire 106 and ring wire 108, which connect to our inventive channel interface unit 112. Channel interface unit 112 resides in a physical slot where a conventional channel unit, e.g., channel unit 4, would normally be placed.

In general, our inventive channel interface unit digitizes any electrical signals which appear on wires 106 and 108. The channel interface unit formats the digitized signals for propagation as a time multiplexed channel in T1 link 114. Channel bank 110 then places the digitized signals into an appropriate channel within a T1 frame.

As is well known in the art a T1 link carries data that is formatted into frames each having a 125 μsec duration. Each frame contains 24 channels, each containing eight bits or one byte. Thus, the effective bit rate of a single channel is 64 Kbps. Overall, a T1 link carries signals at a rate of 1.544 Mbps.

channel banks 110 and 118 are depicted having "n" channel units, where n is an arbitrary integer. However, in a typical D4 channel bank, there are 24 such channel units, i.e., n=24, each assigned a specific channel in a given frame. In general, channel unit 1 supplies data to time-slot 1, channel unit 2 supplies data to time-slot 2, channel unit 3 supplies data to time-slot 3, and so on until the channel bank forms a complete frame of 24 time-slots. As illustratively depicted, our inventive channel interface unit 112 supplies data to the fourth time slot.

Subsequently, successive frames propagate, via T1 link 114, from near end channel bank 110 to far end channel bank 118. The far end channel bank demultiplexes the respective channels and assigns each to an appropriate channel unit. As with the near end channel bank, our inventive channel interface unit 120 resides in a physical slot in the far end channel bank, illustratively, slot 4. As such, channel bank 118 provides the data received in time-slot 4 to channel interface unit 120 located in slot 4.

Channel interface unit 120 converts the digitized signals into analog signals and applies the analog signals to wire pair 122, specifically, tip and ring wires 124 and 126. Importantly, these analog signals are substantially identical to those appearing on near end tip and ring wires 106 and 108. Subsequently, the analog signals propagate along wire pair 122 to alarm detection equipment 128.

Though the foregoing description focused upon signals propagating from alarm monitoring equipment 102 to alarm detection equipment 128, each channel interface unit operates in a full duplex mode. Thus, any signals which the alarm detection equipment returns to the alarm monitoring equipment are digitized by channel interface unit 120 and returned, via T1 link 116, to near end alarm monitoring equipment 102. The form of the return signals may range from an actual signal being generated and sent to the near end to merely a change in the terminating impedance at the far end. In either case, channel interface unit 120 digitizes and transmits whatever signals or changes thereof which appear on wire pair 122 to near end alarm monitoring equipment 102.

To best understand the operation of the channel interface unit, FIGS. 2A and 2B should be viewed simultaneously. The following discussion focuses upon an illustrative alarm system used in conjunction with our inventive channel interface units. Those skilled in the art will realize from this discussion that our inventive channel units can be used in many other applications which presently require two-wire transmission lines. Such applications include equipment used by various utilities for monitoring water, gas and sewage flow rates, and power grid signals and phases. Other applications include communicating telemetry information and controlling remote transmitter facilities.

FIG. 2A depicts a simple model of illustrative alarm system 200 containing near end alarm monitoring equipment 102, two-wire transmission line 214 connected between tip and ring terminals 208 and 210 at a near end location and corresponding tip and ring terminals 216 and 218 at a far end location, and far end alarm detection equipment 128. Generally, near end alarm monitoring equipment 102 sends an electrical signal through transmission line 214 to far end alarm detection equipment 128. Illustratively, the signal is a DC voltage applied across tip and ring terminals 208 and 210 which produces a DC current through the transmission line. However, using a DC voltage is merely illustrative of one type of signal used by alarm systems. Alarm systems may utilize DC voltage, DC current, AC voltage, AC current, or any combination thereof. In the simple illustrative example, a current is monitored to detect a change therein whenever an alarm condition occurs. For example, if a fire occurs at the far end location, the far end alarm detection equipment may open circuit the transmission line. The near end alarm monitoring equipment would detect the open circuit as the DC current flowing through the transmission line fell to zero. In response, the alarm monitoring circuit produces an indicator at the near end to notify the alarm company employees that an alarm has been triggered.

More specifically, near end alarm monitoring equipment 102 contains voltage source 202, source impedance 204, and signal monitoring circuit 206. For this simple illustrative example, voltage source 202 generates 3 volts and source impedance 204 is 1 ohm. Signal monitoring circuit 206 monitors the current into the transmission line by measuring the voltage drop across the source impedance. Transmission line 214 has an impedance ($R_z$) of ½ ohm in each wire represented by resistors 212. For this example, the wires connecting the alarm monitoring equipment and the alarm detection equipment to the transmission line are assumed to be perfect conductors, i.e., have zero impedance. Far end alarm detection equipment 128 contains load resistor 222 having a value of 1 ohm and alarm circuit 220. For simplicity, alarm circuit 220 only contains a switch (not shown) which is normally closed, but opens whenever an alarm is triggered at the far end location. Consequently, during normal operation a 1 amp current flows through transmission line 214 to load resistor 222 and signal monitoring circuit 206 measures 1 volt across source impedance 204. Upon the occurrence of an alarm, alarm circuit 220 opens a switch, causing the current in the transmission line to fall to zero. As a result the voltage drop across the source impedance falls to zero and signal monitoring circuit 206 will detect the current loss and indicate that an alarm has been triggered.

The goal of our inventive channel interface unit is to replace two-wire transmission line 214 with two digital channels (send and receive) in a T1 link while ensuring that the intervening T1 link is substantially transparent to the alarm monitoring equipment and the alarm detection equipment. As shown in FIG. 2B, the transmission line is replaced with T1 link 240 and a pair of channel interface units 112 and 120. For simplicity, the channel banks in which the channel interface units are installed are not shown. Each channel interface unit is respectively divided into tip circuits 231 and 241 and ring circuits 233 and 243. Under normal operating conditions of the foregoing example, i.e., no alarm, tip circuit 231 must sink 1 amp of current from near end alarm monitoring equipment 102. Ring circuit 233 must complete a circuit path for the 1 amp and source 1 amp into ground. In this manner, the near end alarm monitoring equipment will operate as if it were connected to the transmission line of FIG. 2A. Similarly, at the far end, tip circuit 241 must source 1 amp into far end alarm detection equipment 128, and ring circuit 243 must sink 1 amp from far end alarm detection equipment 128. Consequently, the far end alarm detection equipment will operate as if it were connected to the transmission line of FIG. 2A.

In particular, tip circuit 231 contains analog-to-digital (A/D) converter 224, digital-to-analog (D/A) converter 230, driver amplifier 228, and load impedance 226. Of course, tip circuit 231 must contain circuitry for interfacing the channel interface unit to the T1 link. For simplicity, this circuitry is presently ignored and not shown. Typically, load impedance 226 is approximately equivalent to the transmission line impedance, in this instance, ½ ohm. Assuming, for this simple example, that the channel interface units and the T1 link operate instantaneously, the voltage at tip terminal 208 is 2 volts. This voltage is converted to a digital signal by A/D converter 224. The digital signal is transmitted through T1 link 240 to D/A converter 242 in tip circuit 241. The D/A converter changes the digital signal into an analog signal. The driver amplifier amplifies the analog signal to a 2 volt amplitude and applies the 2 volt signal to the series connected tip circuit load impedance 246 (½ ohm) and far end alarm detection equipment load resistor 222 (1 ohm). This produces a 1 amp current and a 1.5 volt signal at tip terminal 216. A/D converter 248 converts the 1.5 volt signal into a digital signal and transmits the digital signal through T1 link 240 to tip circuit 231. Therein, D/A converter 230 converts the digital signal to an analog signal. Driver amplifier 228 amplifies the analog signal to a 1.5 volt magnitude and applies the 1.5 volt signal to tip circuit load impedance 226. As a result, the driver amplifier must sink 1 amp of current, i.e., 0.5 volt drop across the ½ ohm driver output impedance. Consequently, the tip wire extending between tip terminals 208 and 216 is accurately modeled by interface units 112 and 120 and T1 link 240.

In a similar manner, T1 link 240 and ring circuits 233 and 243 form a circuit which simulates a ground connection at ring terminal 210. Thus, to complete the DC circuit shown in FIG. 2A, ring circuit 233 shown in FIG. 2B must source 1 amp of current and ring circuit 243 must sink 1 amp of current. The ring circuit 233 of the channel interface unit 112 contains analog-to-digital (A/D) converter 232, digital-to-analog (D/A) converter 238, driver amplifier 236, and load impedance 234. Typically, load impedance 234 is approximately equivalent to the transmission line impedance, in this instance ½ ohm. Operation of the ring circuits is identical to the operation of the tip circuits described above.

When an alarm occurs, as in the foregoing description of FIG. 2A, the far end alarm detection equipment open-circuits the connection between tip terminal 216 and load resistor 222. In response, the channel interface units adjust their output voltages to simulate such an open circuit. Specifically, driver amplifier 228 produces a 3 volt output. Consequently, no current will flow out of or into channel interface unit 112, i.e., a 0 volt drop appears across driver output impedance 226. Similarly, driver amplifier 244 generates a 3 volt output. Driver amplifiers 236 and 252 in ring circuits 233 and 243 each generate zero volts. In this manner, during an alarm condition, the voltages and currents at the tip and ring terminals of FIG. 2B are identical to the voltages and currents at the tip and ring terminals of FIG. 2A. Importantly, these voltages and currents are identical during both alarm and normal operation of the alarm detection and monitoring equipment. As a result, the interface units and T1 link are substantially transparent to the alarm equipment at each end of the communication system.

The forgoing example assumed that the channel interface units and the T1 link operated instantaneously. In practice, the process of digitizing, transmitting, receiving, digital-to-analog converting, and then subsequently, returning a response, can introduce an inordinate amount of delay within the system. This delay is known in the art as effective capacitance because such a delay can be modeled as a classic R-C delay circuit. Additionally, the analog signals cannot be represented by an infinite number of bits nor can a great number of bits be transmitted within each channel; therefore, quantization error causes DC inaccuracies upon converting the digitized signals back to analog signals. Furthermore, other circuit anomalies, such as transmission errors, A/D or D/A conversion errors and circuit non-linearities add to the DC inaccuracy. The DC inaccuracy is known in the art as DC leakage or leakage resistance. To achieve optimum channel interface unit performance, both leakage resistance and effective capacitance should be minimized. As will be apparent from the following discussion, our invention significantly reduces the leakage resistance and effective capacitance as compared to the interface equipment in the prior art.

B. Hardware Description

1. Overview

FIG. 3 depicts a high level block diagram of our inventive channel interface unit 120. The channel interface unit used at the far end and at the near end of a given communications/signaling system are identical to one another. For simplicity, we will only discuss channel interface unit 120. The channel interface unit contains digital circuitry 300, driver circuitry 302, multiplexer (MUX) 304 and voice processing circuitry 306. Digital circuitry 300 performs the interface to the channel bank (FIG. 1), all timing functions and both analog-to-digital (A/D) conversion and digital-to-analog (D/A) conversion. Driver circuitry 302, in response to the analog signals generated by digital circuitry 300, produces appropriate voltage and current signals at tip and ring terminals 216 and 218. Voice processing circuitry 306 digitizes differential voice signals which appear across tip and ring terminals 216 and 218 during voice frequency (audio) transmissions on tip and ring wires 124 and 126. The digitized audio signals are passed to digital circuitry 300 for transmission within the channel. Additionally, voice processing circuitry 306, in response to digital audio signals received from the T1 link, generates analog signals that are sent, along line 308, to the driver circuitry for transmission as differential audio signals on tip and ring wires 124 and 126. MUX 304 multiplexes the signals appearing on the individual tip and ring wires prior to A/D conversion. Thus, the A/D process converts a multiplexed signal produced by multiplexing a tip signal and a ring signal in an alternating pattern.

The operation of each individual circuit discussed above is described in detail below. For best understanding, the details of the channel interface unit will be described along a signal flow path through the unit. Specifically, the description will begin with the ring and tip signals at ring terminal 216 and tip terminal 218, describe how the channel interface unit processes these signals and transmits the signals as one or more channels on a T1 link. Then, the description will address how the channel interface unit converts information contained in a channel received from the T1 link into analog signals for propagation on the ring and tip wires.

Generally, voice processing circuitry 306 converts a differential ring and tip voice signal located across tip and ring wires 124 and 126 into a digital signal. The digital signal is sent to digital interface 316 for placement into a channel in a T1 frame. Specifically, tip and ring terminals 216 and 218 connect to differential amplifier 310 having unity gain. The output of differential amplifier 310 is connected to analog voice processor 312. The output of the differential amplifier is a voice signal representative of the differential ring and tip voice signal. In a manner well known in the art, analog voice processor 312 digitizes the output of differential amplifier 310. Specifically within this processor, CODEC (coder/decoder) 311 converts the output of differential amplifier 310 into a pulse code modulated (PCM) signal. Adaptive differential pulse code modulation circuit (ADPCM) 309 converts, using well known data compression techniques to achieve an eight-to-three compression ratio, the PCM signal produced by the CODEC into 3-bit digital signal. An illustrative CODEC is model TP3054 manufactured by National Semiconductor Corporation of Santa Clara, Calif. and an illustrative ADPCM circuit is model DS2165 manufactured by Dallas Semiconductor of Dallas, Tex. The arrangement and operation of these components to perform the digitization of the voice signal is well known in the art and therefore will not be explained in any further detail. The voice processing circuitry sends the 3-bit digital voice signal along path 314, every 125 μsec, to digital interface 316 within digital circuitry 300.

Now, turning to the process by which DC and low frequency signals at tip and ring terminals 216 and 218 are digitized. The tip and ring terminals are connected directly to MUX 304. The MUX alternatively selects, in response to a control signal on line 305 from microcontroller 322, first the tip signal and then the ring signal. The output of MUX 304 connects to A/D converter 324 within digital circuitry 300. The A/D converter samples and converts the analog tip and ring signals into 12-bit digital signals. The A/D converter samples and converts the tip signal every 750 μS. Similarly, the A/D converter samples and converts the ring signal every 750 μS. The tip and ring signal are sampled approximately 100 μS apart, i.e., the MUX is switched from the tip terminal to the ring terminal as soon as a tip signal sample is digitized. Alternatively, two A/D converters, one for the tip signal and one for the ring signal, could be used to simultaneously sample and convert the tip and ring signals into digital signals. As such, the digitized tip and ring signals accurately represent any differential voltage between the tip and ring signals at the instant the sample is taken. An illustrative A/D converter is model ADC1251 manufactured by National Semiconductor Corporation of Santa Clara, Calif. To provide an accurate and repeatable conversion, an accurate reference voltage provided by voltage reference 326 is used by A/D converter 324.

Digital circuitry 300 provides the interface for transmitting the digital voice and DC signals as a channel in a T1 link. Specifically, digital circuitry 300 contains digital interface 316, microcontroller 322, D/A converter 328, A/D converter 324, microcontroller reset circuit 320, option selection switches 352 and alarm indicators 354. Microcontroller 322 controls every operation of channel interface unit 120. Illustratively, microcontroller 322 is a model 87C51, 8-bit microcontroller, manufactured by Intel Corporation of Santa Clara, Calif. This particular integrated circuit contains internal read-only-memory (ROM), random-access-memory (RAM), timers/counters and an interrupt controller. ROM and RAM store software for controlling the operation of the channel interface unit. External to the microcontroller and connected thereto are reset circuit 320, option selection switches 352 and alarm indicators 354. Upon initial start-up of the channel interface unit, reset circuit 320 prevents the microcontroller from executing software until all power supply voltages have become stable. Option selection switches 352 enable a user to select certain options for the channel interface unit to perform while connected to equipment supplied by this particular user. Typically, these switches are positioned to select whether voice is to be transmitted (voice/no voice mode), whether the channel interface unit should transmit only (transmit only mode), to select a higher driver output impedance, and to set the driver outputs at zero volts (ground simulation mode). Each of these options are discussed in detail below. Additionally, various alarm indicators are connected to the microcontroller. These alarm indicators are illuminated when an error or fault occurs within the channel interface unit.

Digital interface 316 performs the data formatting function and connects, via path 318, to channel bank 118. The digital interface is a single integrated field programmable gate array circuit (FPGA). An illustrative FPGA is model XC3020 manufactured by XILINX, Inc. of San Jose, Calif. Such FPGAs are well known in the art, and as such, a detailed description of the internal structure of the device is unnecessary. Those skilled in the art will be able to appropriately program such a device by referring to the following discussion of its function.

In general, digital interface 316 operates to properly format the digitized voice and DC signals (including any low frequency signals below the voice band), hereinafter referred to as voice and DC data, for transmission as a channel in a T1 frame produced by channel bank 118. Additionally, digital interface 316 processes information received from channel bank 118 such that proper signal synchronization is maintained. In addition, the digital interface separates data from the channel into voice and DC data and routes along path 314, the voice data to analog voice processor 312. Both the DC and voice data are routed to microcontroller 322. In the detailed description of the digital interface below, we will first describe the function of the digital interface for transmitting data onto the T1 link. Secondly, we will describe the digital interface as it functions to receive data from the T1 link.

Specifically, digital interface 316 formats the 3 bits of voice data, one framing bit and 4 bits of DC data into a 64 Kbps signal, i.e., an 8-bit transmission byte every 125 μsec. To do so, the 3 bits of voice data is inserted into every transmission byte. The 12 bits of DC data produced by A/D converter 324 are divided into three 4-bit data blocks and are inserted into transmission bytes in three consecutive frames. The fourth bit in each byte is filled with a framing bit. In this manner, to transmit a single digitized sample of the tip signal, three frames are used. Similarly, to transmit a single digitized sample of the ring signal, three frames are used. The framing bits in those six frames form a pattern, e.g., "011111", where the "0" represents the channel containing a first "nibble", i.e., the first 4 bits of a 12-bit tip signal sample. This nibble is known as the "high nibble" and is contained in a data byte known as the "first tip byte". The specific arrangement of bits within the channel (data protocol) is as follows: 3 bits of voice data, one framing bit, and 4 bits of DC data. Following transmission of the first tip byte, is a second tip byte having a similar data protocol. Specifically, the second tip byte contains 3 bits of voice data, "1" as the framing bit, and a medium nibble of DC data from the 12-bit digitized tip signal sample. The second tip byte is followed in the next consecutive frame with a third tip byte having the same data protocol. This completes a transmission of the digitized tip signal sample. The next three frames each contain a channel using the same protocol, but rather than conveying the digitized tip signal sample, the digitized ring signal sample along with voice data is conveyed. In this manner, over a period of six frames, or 750 μsec, the digital interface transmits, via the channel bank and a T1 link, six digitized voice signal samples, a digitized tip signal sample and a digitized ring signal sample.

At the near end of the T1 link, another channel interface unit, identical to the channel interface unit at the far end, receives the data in the channel. Since both ends of the T1 link are connected to a channel bank containing identical channel interface units, channel interface unit 120 of FIG. 3 will again be used to describe the circuitry used to receive the data.

As alluded to above, digital interface 316 receives the data from each channel in each frame. Digital interface 316 passes the data to microcontroller 322. The microcontroller separates the voice data from the DC data and the framing bit. The framing bits are monitored to determine which frame contains the high nibble tip data. Once determined, the 12-bits of digitized tip and ring samples can easily be reconstructed and transferred to dual 12-bit D/A converter 328.

Specifically, digital interface 316 sends, along path 314, the 3-bit voice data directly to voice processing circuit 306. Within the voice processing circuit, the 3-bit signal is decompressed by ADPCM circuit 309 to form an 8-bit PCM signal. The PCM signal is, subsequently, processed by CODEC 311 to produce an analog voice signal. The analog voice signal is sent, via line 308, to driver circuit 302 where the analog voice signal is converted into a differential signal and applied to tip and ring terminals 216 and 218.

Digital interface 316 sends each entire 8-bit byte received from the channel to microcontroller 322. The microcontroller uses each 4-bits of DC data from each successive channel to produce two complete 12-bit samples, i.e., a ring sample and a tip sample. The microcontroller sends both 12-bit samples to dual D/A converter 328 which converts the digital signals (12-bit samples) into two respective analog signals. To achieve an accurate and repeatable D/A conversion, voltage reference 326 provides a stable voltage reference for D/A converter 328. An illustrative D/A converter is model AD7537 manufactured by Maxim Integrated Products of Sunnyvale, Calif.

The D/A converter forms two outputs, a tip signal and a ring signal. The tip signal enters noise filter 336; the ring signal enters noise filter 330. Each filter is a low pass filter designed to pass DC and low frequency signals and suppress noise in the voice band. Generally, noise filters 336 and 330 are respectively bypassed by switches 334 and 332. The switches are open, thus engaging the filters, only when the channel interface unit is used in an application which transmits voice signals. Specifically, the noise filters are designed to limit the conversion noise from D/A converter 328. Such noise is produced by the D/A converter even when the D/A converter is idle. Without these filters, the conversion noise would corrupt both the voice signals received from the tip and ring wires and those signals which are transmitted onto both the tip and ring wires. The switches are under the control of microcontroller 322. In operation, if the channel interface unit is expected to convert and transmit voice signals, the channel interface unit employs the noise filters until a substantial DC signal level change is sensed within the received DC data. Because the filters will slow the response time of the channel interface unit to changes in DC signals (including low frequency signals), the channel interface unit repositions switches 332 and 334 to bypass the noise filters whenever the channel interface unit must produce a change in the DC level on the tip and ring wires. The details of the operation of the microcontroller in sensing a DC signal level change and appropriately responding is described below.

The output of D/A converter 328 varies from −5 volts to 0 volts; while a bipolar input signal is required to control tip power supply 344 and ring power supply 342. Therefore, scaling circuits 340 and 338 respectively scale the tip and ring signals from a range of −5 volts through 0 volts to a range of ±7.5 volts. In this manner, the scaling circuits respectively produce so-called scaled tip and ring signals.

The scaled tip and ring signals are respectively used to control tip and ring power supplies 344 and 342. The scaled tip and ring signals are indicative of the magnitude and polarity of the signal that will be ultimately placed on the tip and ring wires. In response to the scaled tip and ring signals, the respective power supplies adjust the voltage supplied to ring and tip drivers 346 and 348. Adjustment of the voltage, so supplied, controls an amount of power that each driver will dissipate while sinking or sourcing current to a load. The power supplies track the output voltage of the drivers in such a manner that the power supplies apply only a minimal amount of voltage to the drivers to produce the necessary output voltage or current. Consequently, the amount of heat dissipated by the driver transistors is minimized. As a result, the channel interface unit operates very efficiently. Our inventive tracking power supplies 342 and 344 are described in detail below.

Ring and tip drivers 346 and 348 are, in essence, high power amplifiers. Each driver is supplied with controlled high voltage, e.g., $\pm V_{ss}$, from respective power supplies 342 and 344. Additionally, the scaled ring and tip signals are applied as respective inputs to the drivers. The output of each driver is proportional to the magnitude and the polarity of the input signal. However, the polarity of the output of each driver is opposite the polarity of the input signal. Additionally, the analog voice signal forms an input to each respective driver. The voice signal is supplied directly to ring driver 346. However, the voice signal is inverted by inverting amplifier 350 prior to being applied as an input to tip driver 348. In this manner, the respective voice signals, when amplified and applied to the tip and ring terminals, will form a differential signal. The drivers, through the use of internal protective circuitry (not shown), are limited to producing a DC output ranging from +135 volts to −135 volts at a maximum current of 60 mA. Additionally, by applying both the analog voice signal and the DC signal as simultaneous inputs to each driver, the analog voice signal can be superimposed upon the DC signal. The details of the circuitry comprising the drivers is discussed below.

In operation, the present AC and DC voltage levels on the tip and ring wires at a near end digital interface circuit are digitized and sent within a channel in a T1 transmission to a far end digital interface circuit. At the far end, the digitized signals are transformed into analog DC and AC signals which are substantially identical to the previously digitized signals at the near end. Subsequently, the analog DC and AC signals are applied to the tip and ring terminals at the far end.

The AC signal path through the entire communication/signaling system in which the channel interface units are used form, in essence, a positive feedback loop. The positive feedback loop is formed by a path starting at the far end two-wire transmission line, through the channel interface unit where a signal on the two-wire transmission line is digitized and sent to the near end channel interface unit which places the AC signal on the near end two-wire transmission line. The path completes when the near end channel interface digitizes the AC signal (the same signal the unit is currently generating) and transmits the AC signal back to the far end channel interface unit. To ensure that the positive feedback loop does not oscillate, analog voice processor 312 contains circuitry to cancel the feedback. Accordingly, when an AC signal appears on the far end tip and ring wires, the signal is digitized and sent to the near end. The near end channel interface unit produces the AC signal on its associated tip and ring wires. Consequently, voice processing circuit 306 would normally digitize the AC signal that appears on the tip and ring wires and send it back to the far end thus forming a positive feedback loop. However, cancellation circuit 313 ensures that the newly produced AC signals are not digitized and feedback to the near end. The cancellation circuit inverts the newly produced AC signal from the voice processing circuit and sums the inverted signal with the signal presently on the tip and ring wires. The summation is digitized and transmitted as voice data over the T1 link. In this manner, any signal that is both generated by the processor and on the tip and ring wires is canceled. Hence, the positive feedback loop is broken. Such signal cancellation circuitry is widely used in the art for preventing system oscillation in circuitry for performing a two to four-wire conversion. Therefore, detailed depiction and further explanation of this circuit is not necessary to understand the operation of our invention.

2. Ring and Tip Driver and Power Supply

Figure 4B:
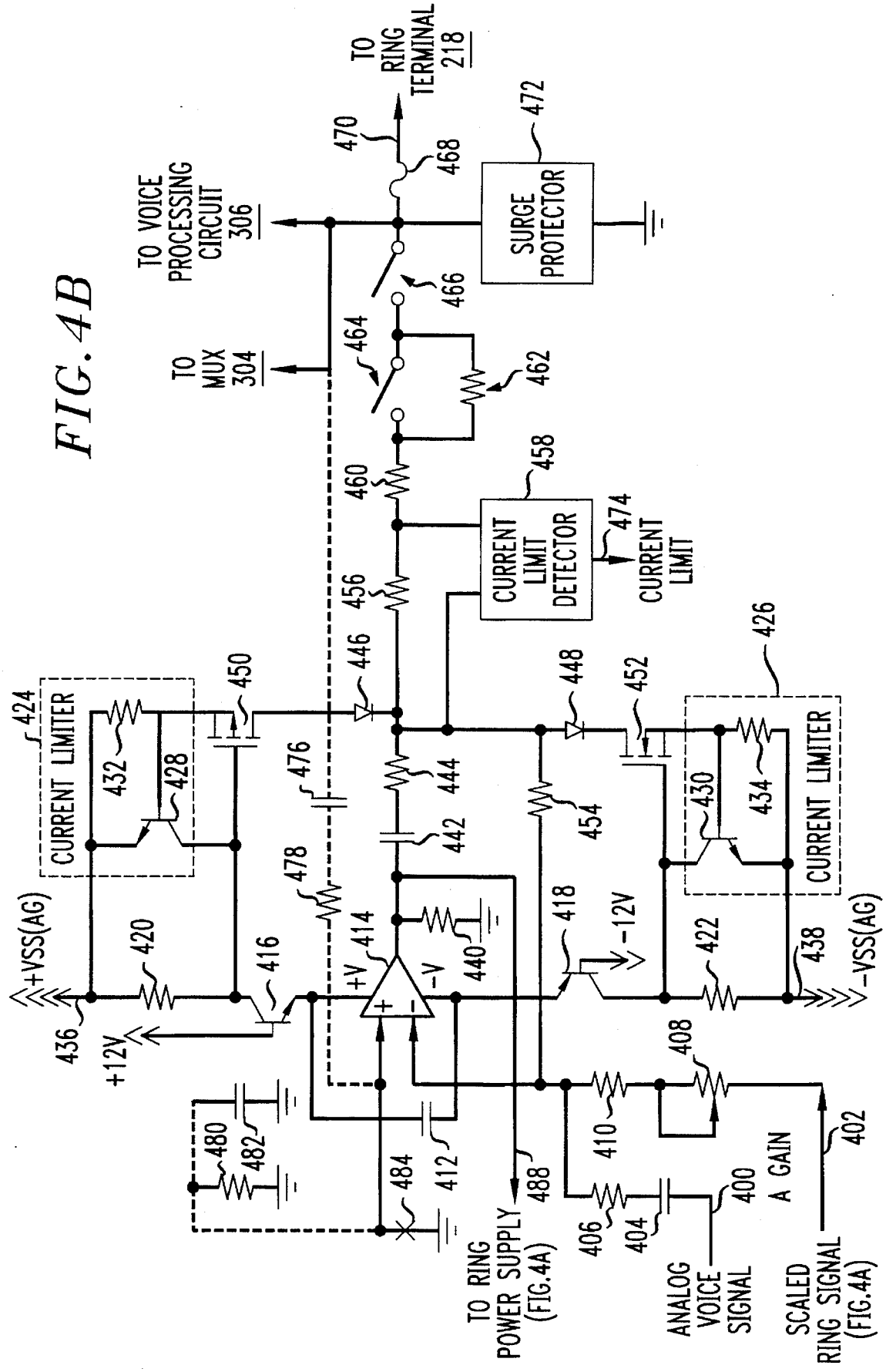
FIG. 4B depicts a schematic diagram of ring driver 346 shown in FIG. 3.

FIG. 4 depicts the proper alignment of FIGS. 4A and 4B. To best understand the following discussion both FIGS. 4A and 4B should be consulted simultaneously. FIG. 4A depicts a detailed block diagram of ring power supply 342 that generates high voltage for ring driver 346 shown as a detailed schematic in FIG. 4B. Tip driver 348 and tip power supply 344 are identical to ring driver 346 and its corresponding power supply 342, thus, only the ring driver and its corresponding power supply are depicted in FIG. 4A and 4B and discussed below.

To best understand the operation of ring driver 346 and its corresponding power supply 342, the schematic of the ring driver shown in FIG. 4B will be discussed prior to discussing the ring power supply shown in FIG. 4A. In general, ring driver 346 is a high power amplifier. The ring signal on line 470 is an amplified composite signal formed of an analog voice signal on line 400 and a scaled ring signal on line 402. Amplification is provided by a combination of operational amplifier (op amp) 414 and complimentary metal-oxide-semiconductor field-effect transistors (MOSFET) 450 and 452. Typically, the driver maintains a voltage gain of −24. Generally speaking, the input signals (on lines 400 and 402) are summed through resistors 406, 408 and 410 to form a composite input signal. The composite input signal is routed to the negative input of op amp 414. The output of op amp 414 drives resistor 440 such that, as the composite input varies, the op amp drives current through resistor 440 to ground. Transistor 416 in series with resistor 420 forms a connection from positive supply voltage $+V_{ss}$, on lead 436, to the positive power supply input of op amp 414. Similarly, transistor 418 in series with resistor 422 forms a connection from negative supply voltage $-V_{ss}$, on lead 435, to the negative power supply input of op amp 414. Consequently, op amp 414 will draw current through either transistor 416 (positive current) or transistor 418 (negative current). The magnitude and polarity of the current drawn is inversely proportional to the value of the composite input signal.

As current is drawn by op amp 414 through transistor 416, a voltage drop across resistor 420 changes in proportion with the quantity of current drawn. Similarly, when current is drawn through transistor 418, the voltage drop across resistor 422 changes in proportion to any changes in that current.

A gate terminal of MOSFET 450 is connected to a junction between resistor 420 and transistor 416. As such, the voltage drop across resistor 420 forms a bias voltage for MOSFET 450. Additionally, current limiter 424 is connected between positive power supply lead 436 and the gate and source terminals of MOSFET 450. Similarly, the gate terminal of MOSFET 452 is connected to the junction between resistor 422 and transistor 418. Also, current limiter 426 is connected between negative power supply lead 438 and the gate and source terminals of MOSFET 452. Consequently, the bias voltage on MOSFETs 450 and 452 varies in response to any change in the voltage drop on resistors 420 and 422. The respective voltage drops across these resistors linearly control the amount of current which flows through each MOSFET (drain to source or source to drain) and, ultimately, to ring terminal 218 as a ring signal on line 470.

Diode 446 is connected between the drain terminal of MOSFET 450 and a junction between resistors 444 and 456. Moreover, diode 448 is connected between the drain terminal of MOSFET 452 and the junction between resistors 444 and 456. Diode 448 ensures that MOSFET 452 only can sink current from a load attached to ring terminal 218. Similarly, diode 446 ensures that MOSFET 450 can only source current to a load.

Capacitor 442, resistor 444 and resistor 454 are connected in series between the output of op amp 414 and the negative input of op amp 414. The junction of resistor 444 and resistor 454 is connected to diodes 446 and 448 and resistor 456. As such, resistor 454 is connected through diodes 446 and 448 to the respective drain terminals of MOSFETS 450 and 452. To stabilize the driver, resistor 454 provides negative voltage feedback and capacitor 442 and resistor 444 through resistor 454 provide AC voltage feedback from the output of op amp 414 to its negative input terminal.

To protect MOSFET 450 from excessively high currents that could potentially harm the MOSFET, current limiter 424 provides circuitry to disable the MOSFET when a high current (more than 70 mA) flows through the current limiter. Current limiter 424 is comprised of resistor 432 and transistor 428. Resistor 432 connects positive power supply lead 436 to the source terminal of MOSFET 450. The emitter and base terminals of transistor 428 are connected across resistor 432; the collector terminal of transistor 428 is connected to the gate terminal of MOSFET 450. In operation, when excessive current flows through resistor 432, transistor 428 will turn on and produce essentially a short circuit across resistor 420. As such, the bias for MOSFET 450 is effectively removed. Similarly, current limiter 426 containing resistor 434 and transistor 430 having the same arrangement of components as current limiter 426 protects MOSFET 452 from excessively high current.

Another feature which limits the magnitude of output current is manifested in current limit detector 458. This current limit detector monitors the voltage drop across resistor 456. When the voltage drop exceeds a pre-determined value equivalent to, for example, 60 mA of current through resistor 456, current limit detector 458 indicates the occurrence of excessive current by changing the status of the current limit signal on line 474, e.g., the current limit signal changes from a high level to a low level. In response to the status change, the current is time averaged to prevent possible destruction of components in the driver. To accomplish time averaging, the microcontroller disables the ring driver power supply for a pre-established period. Upon expiration of the period, the ring driver power supply is enabled until the current limit detector, once again, indicates an excessive current condition. A typical duty cycle for cycling the power supply is 10% on and 90% off.

Resistors 460 and 462, switch 466 and fuse 468 are serially connected between resistor 456 and lead 470. Lead 470 routes an output signal of the driver to ring terminal 218. Resistors 460 and 462 establish an output impedance for the driver. Each resistor is approximately 450Ω. Switch 464, connected across resistor 462, adds resistor 462 to the output impedance produced by resistor 460 to offer an increased speed option for the channel interface unit. By increasing the output impedance, any changes in current at the tip or ring terminals is reflected as a larger change in voltage across the output impedance of the driver than would occur with a smaller driver impedance. In this manner, the larger voltage change is digitized as previously described and sent to the far end to adjust the voltage on the corresponding wire in a faster manner due to the larger voltage increase. However, to accomplish this improvement without affecting the performance of the loop, apparatus to which the channel interface unit is connected, i.e., alarm equipment, must be capable of operating with the increased line resistance (as simulated by the driver output impedance), i.e., approximately 900Ω versus 450Ω. The increased resistance causes higher signal losses throughout the system. For some applications, the increased losses are easily absorbed without any performance degradation of the overall system. For those systems which would be detrimentally effected by the higher losses, resistor 462 can be switched out of the circuit by switch 464.

Switch 466 disconnects the driver from the ring terminal thus rendering the channel interface unit capable of transmitting (relative to the T1 link) only. This is an important feature of our inventive channel interface unit. In some applications, duplex communications between the far end and near end are unnecessary. Thus, with a simple change of a switch position, the channel interface unit is changed from a duplex unit to a unidirection unit. At the ring terminal side of switch 466, the ring signal is routed to MUX 304 and voice processing circuit 306. In effect, by opening switch 466, an infinite output impedance is placed at the driver output. Consequently, the ring terminal is connected through the MUX to the A/D converter. The impedance seen by the ring terminal is essentially an open circuit, e.g., a high impedance voltage divider network (not shown) at the input of the A/D converter. Such a high impedance promotes the transmission of larger voltage changes for each change in current flowing on the ring wire. As such, the interface unit will produce the correct current at the far end faster than if driver 346 was not operating in the transmit only mode, i.e., with switch 464 closed.

To protect the channel interface unit from damage due to lightning strikes or other abnormal events causing foreign and extreme electrical surges on the ring wire, the driver contains surge protector 472 and fuse 468 connected to line 470.

FIG. 4A depicts a detailed block diagram of ring power supply 342. Generally, the ring power supply contains two subassemblies, namely, switching power supply 401 and control circuit 403. Switching power supply 401 generates two controlled (regulated) high voltage outputs on two separate output leads (436 and 438) respectively ranging from 0 volts to approximately +160 volts and 0 volts to approximately −160 volts. Hereinafter, these two output voltages are referred to as being produced by a positive power supply and a negative power supply even though, in actuality, they are both simultaneously produced by a single switching power supply. These output voltages are routed, via lines 436 and 438, to the ring driver. The specific values of the output voltages are controlled by control circuit 403. In response to certain signal characteristics, including the magnitude and polarity of the scaled ring signal and whether driver 346 must source or sink current, the control circuit establishes a voltage control signal on line 405 to set the values of the output voltages produced by switching power supply 401.

To improve the efficiency of the channel interface unit, the control circuit uses two modes of operation; namely, track and idle. In the track mode, the driver sources and sinks current as needed using fully regulated positive and negative power supplies. In this mode, the voltage control signal, and therefore the switching power supply outputs, essentially track the scaled ring signal. In this manner, the power supply generates voltages that will enable the driver to produce the correct current and voltage on the ring wire, but will not cause an excessive voltage drop across the driver circuitry. However, when the control circuit senses that the driver must source or sink current by placing an unnecessarily large voltage across one or the other MOSFET, the control circuit switches to an idle mode. In this mode, an unregulated, fixed voltage, known as headroom voltage, is produced at the high voltage outputs of switching power supply 401. In this manner, the voltage drop across the driver circuitry is limited and the efficiency of the channel interface unit is improved over those lacking such a circuit. In other words, without such a tracking power supply a large fixed voltage is maintained across the driver circuitry causing the driver to unnecessarily dissipate, typically through a heat sink, a large amount of power.

Specifically, switching power supply 401 contains pulse width modulator (PWM) 409, driver 411, switch 413, and switching transformer 415. Ancillary conventional circuits which are not shown include a circuit for generating a clock signal on line 407 and a circuit for producing −48 volt DC power on line 417. From the −48 volts, switching power supply 401 produces the high voltage on lines 436 and 438. The −48 volts is drawn from a battery power supply within the channel bank. Typically, the clock signal is derived directly from a channel bank clock signal. In this manner, the clock signal generating circuitry is external to the channel interface unit.

In operation, control circuit 403 produces an analog control signal, on line 405, that controls PWM 409. The manner in which this control signal is produced is discussed below. Switching power supplies are old in the art and the particular implementation of the switching power supply is not critical to our invention. Therefore, further detailed discussion of the switching power supply is not required to understand and implement our invention. Suffice it to say that the switching power supply produces both a positive and negative high voltage output voltages, $+V_{ss}$ and $-V_{ss}$. The magnitudes of both voltages are controlled by the voltage control signal on line 405. Illustratively, in response to this control signal $+V_{ss}$ can be varied from 0 to approximately +160 volts and $-V_{ss}$ can be varied from 0 to approximately −160 volts.

Control circuit 403 contains magnitude detector 419, track/idle switch 427, polarity detector 421, sink/source detector 423, switch control circuit 425, positive supply feedback scaler 435, negative supply feedback scaler 433, headroom control circuit 437, comparator 447, and damping current limiter 449. Together this circuitry monitors both the scaled ring signal, on line 402, and a ring driver feedback signal, on line 488, to produce, on line 405, a control signal for the switching power supply. In operation, magnitude detector 419 monitors the scaled ring signal. The magnitude detector determines the absolute value of the scaled ring signal and generates a magnitude signal representing only the magnitude of the scaled ring signal.

Sink/source detector 423 determines whether the ring driver is sourcing or sinking current with respect to the load. From the ring driver feedback signal, on line 488, the sink/source detector produces either a positive signal (source) or a negative signal (sink). Such a sink/source detector can be implemented by an infinite gain amplifier connected via line 488 to the output of op amp 414. Such an amplifier will have, illustratively, a +12 volt output for a positive ring driver feedback signal and a −12 volt output for a negative ring driver feedback signal. Diodes 429 and 431 connect the output of sink/source detector 423 respectively to positive supply feedback scaler 435 and negative supply feedback scaler 433. A +12 volt signal from the sink/source detector biases diode 429 off and biases diode 431 on. In this manner, positive supply feedback scaler 435 is enabled such that the positive high voltage supply will be regulated by the control signal on line 405. The positive supply feedback scaler divides $+V_{ss}$ by the amount of amplification supplied by the driver amplifier. Illustratively, the amplification is 24. Thus, the positive channel feedback scaler divides $+V_{ss}$ by 24. Headroom control circuit 437 contains diodes 441, 439, and 443 which are respectively manufactured from silicon and germanium. Diodes 441 and 443 are serially connected between positive supply feedback scaler 435 and the negative input of comparator 447. Diodes 439 and 443 are serially connected between negative supply feedback scaler 433 and the negative input of comparator 447. As such, the serially connected diodes cumulatively form a voltage drop of approximately 1 volt. Resistor 445 connected between a −12 volt supply and the negative terminal of comparator 447 biases the diodes comprising headroom control 437, such that they maintain a consistent voltage drop. Therefore, the approximate voltage at the negative input of comparator 447 is $$\frac{V_{SS}}{24} - 1.$$

Polarity detector 421 monitors the scaled ring signal and produces a negative signal when the scaled ring signal is positive (negative driver output voltage) and a positive signal when the scaled ring signal is negative (positive driver output voltage). This function can also be accomplished with an inverting infinite gain amplifier.

The output of polarity detector 421 and the sink source detector output form input signals to switch control circuit 425. The switch control circuit controls track/idle switch 427. When the sink/source detector indicates source and the polarity detector indicates a negative scaled ring signal or when the sink/source detector indicates sink and the polarity detector indicates a positive scaled ring signal, the switch control circuit switches the track/idle switch into the track position. As such, the magnitude signal from magnitude detector 419 connects through track/idle switch 427 to the positive terminal of comparator 447. Alternatively, when the sink/source detector indicates sink and the polarity detector indicates a negative scaled ring signal or when the sink/ source detector indicates source and the polarity detector indicates a positive scaled ring signal, the switch control circuit switches the track/idle switch into the idle position. As such, the positive terminal of comparator 447 is connected to ground. In either case, the comparator compares the signals at its positive and negative terminals and produces a difference signal. The difference signal is passed through damping current limiter 449 to control the feedback loop response and prevent oscillations. The output of the damping current limiter is the switching power supply control signal on lead 405.

In practice, the power supply and driver combination operates in four modes as follows: (1) source current to the load from the positive (+$V_{ss}$) power supply and maintain a positive potential from the driver, (2) sink current from the load into the negative (-$V_{ss}$) power supply and maintain a negative potential from the driver, (3) source current from the positive (+$V_{ss}$) power supply and maintain a negative potential from the driver and (4) sink current into the negative (-$V_{ss}$) power supply and maintain a positive potential from the driver. The channel interface unit continuously transitions between these modes in response to variations in the scaled tip and ring signals. Each of these modes of operation is respectively depicted in FIGS. 5, 6, 7, and 8. However, to best understand the operation of our invention described below, it is suggested that the reader simultaneously refer to FIGS. 4A and 4B as well as FIGS. 5–8.

In mode 1, the positive power supply is called upon by the channel interface unit to supply current to the load. As shown in FIG. 5, a load, e.g., alarm monitoring equipment, can be modeled as a voltage supply ($V_L$) in series with a load resistance ($R_L$). In this first mode, the output voltage of driver 346 is to maintain a positive potential. The output voltage from driver 346 is maintained at, e.g., +100 volts while the load voltage is +50 volts. As such, the positive power supply sources a current (i) to the load.

Referring now to FIGS. 4A and 4B, during mode 1, the scaled ring signal indicates that for the channel interface unit to accurately generate an appropriate output voltage, the driver output voltage must be +100 volts. The scaled ring signal will be an analog value which corresponds to a +100 volts, e.g., -$V_{OUT}$/24 or -4.167 volts (-24 is the voltage gain of the driver). As such, magnitude detector 419 determines the absolute value of the scaled ring signal and applies the absolute value to the track terminal of track/idle switch 427. Additionally, the scaled ring signal is applied to the input of driver 346 for amplification to the proper voltage, e.g., +100 volts, and applied to polarity detector 421. The polarity detector generates a positive output indicating that the polarity of the scaled ring signal is currently negative. Also, the sink/source detector will indicate that driver 346 is sourcing current into the load. With sink/source detector 423 indicating source and polarity detector 421 indicating a negative scaled ring signal, switch control circuit 425 positions track/idle switch 427 into the track position. As such, the track/idle switch applies the absolute value of the scaled ring signal to the positive terminal of comparator 447.

Additionally, the output of sink/source detector, a positive voltage, biases diode 429 off and diode 431 on. As such, negative supply feedback scaler 433 is disabled and positive supply feedback scaler 435 is enabled. The positive supply feedback scaler divides the output of the positive power supply by +24 (the absolute value of the driver gain) producing a positive supply feedback signal having a value of |$V_{ss}$|/24. The positive supply feedback signal passes through headroom control 437 which subtracts the headroom voltage, e.g., a voltage drop of about 1 volt, from the positive supply feedback signal. The resulting voltage, (|$V_{ss}$|/24)-1, is applied to the negative input of comparator 447 for comparison to the absolute value of the scaled ring signal. As such, when the positive power supply is regulated, the scaled ring signal at the positive terminal of the comparator is equal to the positive supply feedback signal minus the headroom voltage. In this manner, the positive power supply is regulated to a voltage that is equivalent to the output voltage of the driver plus a scaled headroom voltage. The scaled headroom voltage is the headroom voltage multiplied by the driver gain, e.g., approximately 24 volts. In our present example, the voltage is regulated to approximately +124 volts, e.g., +100 volt driver output plus a +24 volt scaled headroom voltage. The comparator produces an output signal to regulate the positive power supply whenever the two input signals of the comparator are not identical. In this manner, the comparator produces a voltage control signal for the switching power supply which will increase the value of +$V_{ss}$ whenever the voltage at the negative terminal of the comparator falls below the voltage at the positive terminal of the comparator and decreases the value of +$V_{ss}$ when the voltage at the negative terminal of the comparator becomes larger than the voltage at the positive terminal. As described above, when the driver is called upon to source current into a load and a positive polarity voltage must be maintained at the output of the driver, our invention uses the positive power supply to supply, on line 436, a regulated voltage to the driver. As such, the positive power supply is said to "track" the output voltage of the driver. This arrangement produces a power supply voltage having a fixed headroom voltage above the necessary driver output voltage. Consequently, the driver circuitry need only drop 24 volts, i.e., the scaled headroom voltage, for all values of driver output voltage. In general, the scaled headroom voltage is set at an adequate working potential for a particular driver circuit design used to implement the driver. Thus, substantially little, if any, unnecessary amount of voltage need be dropped across the driver circuitry and, as such, our channel interface unit operates efficiently.

In the second mode, shown in FIG. 6, driver 346 is called upon to sink current from load 102 and maintain a negative potential at the output of the driver. The output voltage from driver 346 is maintained at -100 volts while the load voltage is -50 volts. As such, the negative power supply sinks current (i) from the load.

Referring now to FIGS. 4A and 4B, during mode 2, the scaled ring signal indicates that for the channel interface unit to accurately generate an appropriate output voltage, the driver output voltage must be -100 volts. Accordingly, the scaled ring signal will be an analog value which corresponds to a -100 volts, e.g., -$V_{OUT}$/24 or +4.167 volts. As such, magnitude detector 419 determines the absolute value of the scaled ring signal and applies the absolute value to the track terminal of track/idle switch 427. Additionally, the scaled ring signal is applied to the input of driver 346 for amplification (-24×) to the proper voltage, e.g., -100 volts, and applied to polarity detector 421. The polarity detector generates a negative output indicating that the polarity of the scaled ring signal is currently positive. Also, the sink/source detector indicates that driver 346 is sinking current from the load. With sink/source detector 423 indicating sink and polarity detector 421 indicating a positive scaled ring signal, switch control circuit 425 positions track/idle switch 427 into the track position. As such, the track/idle switch applies the absolute value of the scaled ring signal to the positive terminal of comparator 447.

The output of sink/source detector, a negative voltage, biases diode 431 off and diode 429 on. As such, negative supply feedback scaler 433 is enabled and positive supply feedback scaler 435 is disabled. The negative supply feedback scaler divides the output of the negative power supply by −24 producing a negative supply feedback signal having a value of $|V_{ss}|/24$. The negative supply feedback signal passes through headroom control 437 which subtracts the headroom voltage, e.g., a voltage drop of about 1 volt, from the negative supply feedback signal. The resulting voltage, $|V_{ss}|/24-1$, is applied to the negative input of comparator 447 for comparison to the absolute value of the scaled ring signal. As such, when the negative power supply is regulated, the scaled ring signal at the positive terminal of the comparator is equal to the negative supply feedback signal minus the headroom voltage. In this manner, the negative power supply is regulated to a voltage that is equivalent to the output voltage of the driver minus a scaled headroom voltage. The scaled headroom voltage is the headroom voltage multiplied by the driver gain, e.g., approximately 24 volts. In our present example, the voltage is regulated to approximately −124 volts, e.g., −100 volt driver output minus a 24 volt headroom voltage. The comparator produces an output signal to regulate the negative power supply whenever the two input signals of the comparator are not identical. In this manner, the comparator produces a voltage control signal for the switching power supply which will increase the value of $-V_{ss}$ whenever the voltage at the negative terminal of the comparator falls below the voltage at the positive terminal of the comparator and decreases the value of $-V_{ss}$ when the voltage at the negative terminal of the comparator becomes larger than the voltage at the positive terminal. As described above, when the driver is called upon to sink current from a load and a negative polarity voltage must be maintained at the output of the driver, our invention uses the negative power supply to supply, on line 438, a regulated voltage to the driver. As such, the negative power supply is said to "track" the output voltage of the driver. This arrangement produces a power supply voltage having a fixed headroom voltage above the necessary driver output voltage. Consequently, the driver circuitry need only drop 24 volts, i.e., the scaled headroom voltage, for all values of driver output voltage. In general, the scaled headroom voltage is set at an adequate working potential for a particular driver circuitry design used to implement the driver. Thus, substantially little, if any, unnecessary amount of voltage is dropped across the driver circuitry and, as such, our channel interface unit operates efficiently.

In mode 3, depicted in FIG. 7, the positive power supply is called upon by the channel interface unit to supply current to the load. In this third mode, the output voltage of driver 346 is maintained at a negative potential. Specifically, the output voltage from driver 346 is maintained at −50 volts while the load voltage is −100 volts. As such, the positive power supply sources current (i) to the load.

Referring now to FIGS. 4A and 4B, during mode 3, the scaled ring signal indicates that for the channel interface unit to accurately generate an appropriate output voltage system, the driver output voltage must be −50 volts. The scaled ring signal will be an analog value which corresponds to a −50 volts, e.g., $-V_{OUT}/24$ or +2.083 volts (−24 is the voltage gain of the driver). As such, magnitude detector 419 determines the absolute value of the scaled ring signal and applies the absolute value to the track terminal of track/idle switch 427. Additionally, the scaled ring signal is applied to the input of driver 346 for amplification (−24×) to the proper voltage, e.g., −50 volts, and applied to polarity detector 421. The polarity detector will generate a negative output which indicates that the polarity of the scaled ring signal is currently positive. Also, the sink/source detector will indicate that driver 346 is sourcing current into the load. With sink/source detector 423 indicating source and polarity detector 421 indicating a positive scaled ring signal, switch control circuit 425 positions track/idle switch 427 into the idle position. As such, the track/idle switch applies ground, e.g., a zero volt signal, to the positive terminal of comparator 447.

The output of sink/source detector, a positive voltage, biases diode 429 off and diode 431 on. As such, negative supply feedback scaler 433 is disabled and the positive supply feedback scaler 433 is enabled. The positive supply feedback scaler divides the output of the positive power supply by 24 (the absolute value of the driver gain) producing a positive supply feedback signal having a value of $|V_{ss}|/24$. The positive supply feedback signal passes through headroom control 437 which subtracts the headroom voltage, e.g., a voltage drop of about 1 volt, from the positive channel feedback signal. The resulting voltage, $(|V_{ss}|/24)-1$, is applied to the negative input of comparator 447 for comparison to zero volts supplied by the track/idle switch. As such, in the idle mode, the positive power supply will be regulated to a fixed voltage value equivalent to the scaled headroom voltage. In our present example, the voltage is regulated to approximately +24 volts, e.g., a +24 volt scaled headroom voltage. As described above, when the driver is called upon to source current into a load and a negative polarity voltage must be maintained at the output of the driver, our invention uses the positive power supply to supply, on line 436, a fixed voltage to the driver. As such, the positive power supply is said to "idle" at a fixed scaled headroom voltage. This arrangement produces a power supply voltage that will minimize voltage drop across the driver circuitry when the driver must maintain a negative output voltage. Without an idle state, i.e., track only, the power supply would settle at +74 volts. Thus, without an idle state, a voltage drop of 124 volts would appear across the driver circuitry. Thus, in the idle state, only a limited excess voltage drop is produced, e.g., 74 volts, across the driver circuitry and our channel interface unit operates more efficiently than a channel interface unit having a fixed voltage power supply or a track only power supply.

In the fourth mode, shown in FIG. 8, the output voltage of driver 346 is to remain at a positive potential. The output voltage from driver 346 is maintained at +50 volts while the load voltage is +100 volts. As such, the negative power supply sinks current (i) from the load.

Referring now to FIGS. 4A and 4B, during mode 4, the scaled ring signal indicates that for the channel interface unit to accurately model a two-wire system, the driver output voltage must be +50 volts. The scaled ring signal will be an analog value which corresponds to a +50 volts, e.g., $-V_{OUT}/24$ or −2.083 volts. As such, magnitude detector 419 determines the absolute value of the scaled ring signal and applies the absolute value to the track terminal of track/idle switch 427. Additionally, the scaled ring signal is applied to the input of driver 346 for amplification (−24×) to the proper voltage, e.g., +50 volts, and applied to polarity detector 421. The polarity detector generates a positive output indicating that the polarity of the scaled ring signal is currently negative. Also, the sink/source detector indicates that driver 346 is sinking current from the load. With sink/source detector 423 indicating sink and polarity detector 421 indicating a negative scaled ring signal, switch control circuit 425 positions track/idle switch 427 into the idle position. As such, the track/idle switch applies ground, e.g., a zero volt signal, to the positive terminal of comparator 447.

The output of sink/source detector, a negative voltage, biases diode 431 off and diode 429 on. As such, negative supply feedback scaler 433 is enabled and positive supply feedback scaler 435 is disabled. The negative supply feedback scaler divides the output of the negative power supply by −24 (the gain of the driver) producing a negative supply feedback signal having a value of $+V_{ss}/24$. The negative supply feedback signal passes through headroom control 437 which subtracts the headroom voltage, e.g., a voltage drop of about 1 volt, from the negative supply feedback signal. The resulting voltage, $(|V_{ss}|/24)-1$, is applied to the negative input of comparator 447 for comparison to zero volts supplied by the track/idle switch. As such, in the idle mode, the negative power supply will be regulated to a fixed voltage value equivalent to the scaled headroom voltage. In our present example, the voltage is regulated to approximately −24 volts, e.g., a −24 volt scaled headroom voltage. As described above, when the driver is called upon to sink current from a load and a positive polarity voltage must be maintained at the output of the driver, our invention uses the negative power supply to supply, on line 438, a fixed voltage to the driver. As such, the negative power supply is said to "idle" at a fixed scaled headroom voltage. This arrangement produces a power supply voltage that will minimize the voltage drop across the driver circuitry when the driver must maintain a positive output voltage.

C. Software

1. Overview

Software, stored in the read-only-memory (ROM) and random-access-memory (RAM) of the microcontroller, controls every operation of the channel interface unit. These operations include initializing the digital interface, controlling the D/A and A/D converters, implementing the various user defined options and controlling the digital interface. Flow charts of this software are shown in FIGS. 9–14. Specifically, the software contains MAIN LOOP routine 900 (FIG. 9) which further contains a plurality of routines. These routines include ring and tip A/D converter output routines 1200 (FIG. 12) and 1300 (FIG. 13), and ring and tip 60 Hz filter routines 1400 (FIG. 14). Additionally, receive interrupt routine 1000 (FIG. 10) and transmit interrupt routine 1100 (FIG. 11) interrupt execution of MAIN LOOP routine 900 every 125 μsec to control reception and transmission of data from/to the T1 link. As those skilled in the art would realize, one or more routines are executed in the background to perform "watchdog" functions that reset the microcontroller when and if it ever inexplicably stops functioning, i.e., becomes "hung-up" due to loss of transmit and receive interrupts, lack of an acknowledgment from the A/D converter, and the like. These so-called watchdog routines are well known in the art and, for that reason, will not be discussed in any detail.

2. MAIN LOOP routine

FIG. 9 is a flow chart of MAIN LOOP routine 900. The MAIN LOOP routine controls all of the major tasks accomplished by the channel interface unit. From start block 902, the MAIN LOOP routine executes each operation and routine contained therein in a prescribed order. At step 904, upon power being applied to the microcontroller, the microcontroller executes a series of circuit initialization and reset routines. As is well known in the art, these circuit initialization and reset routines initialize various buffers and memory locations to facilitate operation of the microcontroller. Additionally, the MAIN LOOP routine downloads a configuration program required by the field programmable gate array (FPGA).

At step 906, the data bus is cleared of any extraneous data which may have appeared on the bus during power up of the channel interface unit. Additionally, after each pass through MAIN LOOP routine 900, the data bus is cleared to remove any extraneous data which may remain on the bus from a previous pass through the MAIN LOOP routine.

Before proceeding with a substantive task, the MAIN LOOP routine ensures that the hardware and software are synchronized with the framing sequence. At step 908, the MAIN LOOP queries whether a loss of sync flag is set. If this flag is set, the MAIN LOOP routine executes, at step 910, the FAIL routine. The FAIL routine sets a timer to 2.49 seconds, then reenters the MAIN LOOP routine after step 1400. When necessary, resynchronization is accomplished by the receive interrupt routine which is discussed in detail below. For now, suffice it to say that the receive interrupt routine attempts to resynchronize every 125 μsec. Upon resynchronization the loss of sync flag is reset and the query at step 908 will be answered in the negative. However, if the query at step 908 is repeatedly answered in the affirmative; causing the FAIL routine to be repeatedly executed in excess of the 2.49 second counter without an intervening resynchronization, then the microcontroller disconnects power from both the tip and ring drivers, e.g., the power supply voltages are set to zero. Subsequently, the microcontroller is reset and MAIN LOOP routine 900 begins at step 906.

Once the query at step 908 is answered negatively, the MAIN LOOP routine queries, at step 912 whether the ground simulation option has been selected by the user. A detailed discussion of the use and operation of the ground simulation option appears below. If this option has been selected, then the MAIN LOOP routine replaces any data currently stored in a tip D/A buffer and a ring D/A buffer with 800 (HEX). Such data replacement will, upon execution of step 916, instruct the D/A converters to establish a zero volt output at the tip and ring driver outputs. Alternatively, if the ground simulation option is not selected, the MAIN LOOP routine executes step 916.

As discussed above, each T1 frame carries 4 bits of a 12-bit tip or ring signal sample. These 4-bit samples are periodically processed and stored in D/A buffers by a receive interrupt routine, discussed below with respect to FIG. 10. The receive interrupt routine stores in respective tip and ring D/A buffers six 4-bit blocks to re-create a 12-bit tip signal sample and a 12-bit ring signal sample. Once two 12-bit samples are stored in their respective D/A buffers, the MAIN LOOP routine sends, at step 916, those samples to the D/A converter. Whenever the MAIN LOOP routine executes step 916 and less than 12 bits are stored in each D/A buffer, the MAIN LOOP routine does not send the sample to the D/A converter and proceeds to step 918. If, however, the samples are available, the D/A converter simultaneously converts the two samples into two analog signals which are subsequently used to control the signal levels produced by the tip and ring drivers.

Once the D/A output process is complete, the MAIN LOOP routine checks, at step 918, the status of the current limit detectors (shown in FIG. 4B as current limit detector 458 for the ring driver). If the current limit detectors indicate that either the tip or ring driver are producing an excessive amount of current, e.g., more than 60 mA, the microcontroller disables all of the power supplies, starts a 2 second clock and then proceeds onto the next step in MAIN LOOP routine 900 shown in FIG. 9. After the 2 second clock has expired, which may occur after multiple passes through the MAIN LOOP routine, the microcontroller reactivates both drivers by enabling the power supplies and checks the current limit detectors for the presence of the excessive current condition. This process is repeated until the current limit detector no longer indicates the excessive current condition. During the excessive current condition, the channel interface unit experiencing this condition will illuminate a "link down" indicator on the front panel of the channel interface unit and stop transmitting a frame sequence to the far end channel interface unit. This will cause a "link down" condition at the far end to indicate a problem at the near end. Consequently, the "link down" condition causes illumination of a fault indicator on the front panel of the channel interface unit at the far end to alert a user to the malfunction.

Next, the MAIN LOOP routine executes block 920 to invoke tip A/D converter output (TADCONV) routine 1300. TADCONV 1300 instructs the A/D converter to perform a conversion of the present signal level on the tip wire. Upon execution of this routine, the A/D converter generates a 12-bit sample of the tip signal. The 12-bit sample is then stored in memory, e.g., the microcontroller RAM, to await the occurrence of the transmit interrupt routine (discussed below). A detailed description of TADCONV 1300 is presented below.

Similarly, the MAIN LOOP routine executes, at step 922, ring A/D converter output (RADCONV) routine 1200 which instructs the A/D converter to convert the present signal level on the ring wire into a 12-bit sample. The sample is stored until an occurrence of the transmit interrupt routine. A detailed description of RADCONV 1200 is presented below.

Next, the MAIN LOOP routine queries, at step 924, whether the circuitry is configured to transmit and receive voice signals, i.e., operating in a voice or no voice mode. The option of operating in either voice or no voice is described in detail below. If the no voice option is selected, the MAIN LOOP routine returns, along path 926, to the step 906 and continues through the loop. If the voice signal processing circuitry is operational, the MAIN LOOP routine executes, at step 928, ring 60 Hz filter routine 1400, followed by, at step 930, tip 60 Hz filter routine 1400. The filter routines are described in detail below. After executing the filter routines, the MAIN LOOP routine returns to step 906.

2. Receive Interrupt Routine

Figure 10:
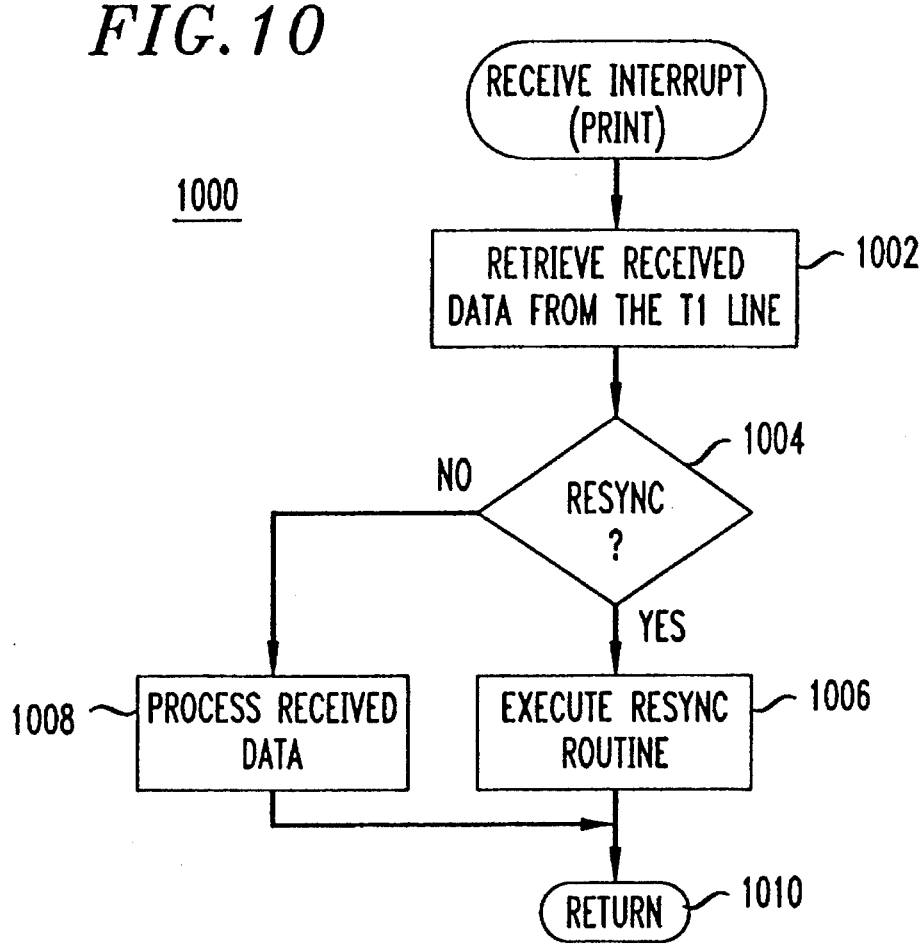
FIG. 10 depicts a flow chart of receive interrupt routine 1000 executing within microcontroller 322 shown in FIG. 3.

FIG. 10 is a flow chart of receive interrupt routine 1000. In general, the receive interrupt routine retrieves received data from the T1 link, resynchronizes the channel interface unit (if necessary) and processes the received data. The microcontroller executes receive interrupt routine 1000 every 125 μsec, i.e., synchronously with the T1 frame rate. At step 1002, the receive interrupt routine retrieves an 8-bit data block (byte) from the T1 link, i.e., data from one channel. At step 1004, the routine queries whether resynchronization to the framing sequence is necessary, i.e., whether the loss of sync flag is set. If the loss of sync flag is set, the routine executes step 1006 which reestablishes synchronization with the incoming data.

Generally, frame synchronization is accomplished by accumulating in memory a number of framing sequence bits, e.g., six. To do so, receive interrupt routine 1000 executes six times before synchronization is possible. Once six (or more) framing sequence bits are accumulated, the synchronization (or resynchronization) is accomplished by searching for a "0" bit in the framing sequence, e.g., "0" in "011111", that indicates a frame carrying, a high nibble of a tip signal sample. The "0" bit indicates the first of six frames which, in combination, carry the 12-bit tip signal sample and the 12-bit ring signal sample.

Those skilled in the art may apply any number of synchronization techniques to achieve frame synchronization. Hence, disclosure of further details of the resynchronization process is not necessary.

Once synchronization (or resynchronization) is achieved, the query at step 1004 is answered negatively and receive interrupt routine 1000 will execute step 1008 to process the data received from the T1 link. The data is processed by separating the DC information from the voice information. The 3 bits of voice information are transferred to the ADPCM for decoding. The 4 bits of DC information are stored in RAM within the microcontroller (D/A buffers) until the 12 bits of tip signal sample and the 12 bits of ring signal sample have been received. Once each complete sample is stored, the MAIN LOOP will execute the D/A converter output routine to convert these digital samples into analog signals for transmission onto respective tip and ring wires.

Once a complete 8-bit data byte is received and processed, receive interrupt routine 1000 returns from the interrupt, at step 1010, and begins execution of the MAIN LOOP routine from the point where the receive interrupt routine interrupted MAIN LOOP routine execution.

3. Transmit Interrupt Routine

Figure 11:
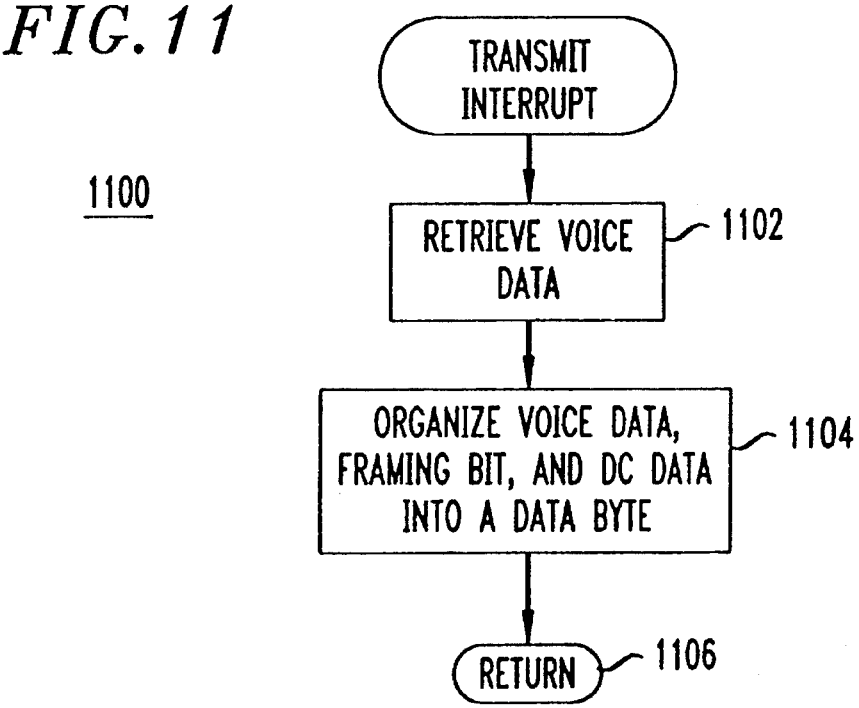
FIG. 11 depicts a flow chart of transmit interrupt routine 1100 executing within microcontroller 322 shown in FIG. 3.

FIG. 11 is a flow chart of transmit interrupt routine 1100. As noted above, the microcontroller executes transmit interrupt routine 1100 every 125 μsec, i.e., synchronously with the T1 frame rate. In this manner, every 125 μsec the MAIN LOOP routine is interrupted and the transmit interrupt routine executes to place data in a channel within the T1 frame.

Specifically, at step 1102, the microcontroller retrieves a 3-bit voice sample (voice data) from memory (RAM in the microcontroller). At step 1104, a 4-bit DC signal sample (DC data) is also retrieved from RAM within the microcontroller. Additionally, at step 1104, the 3-bit voice data is combined with the 4-bit DC data and a framing bit to produce an 8-bit data byte for transmission as a channel in a T1 frame. Specifically, the data byte has the following form:

X X X Y Z Z Z Z where:

X represents a voice data bit

Y represents a framing bit

Z represents a DC data bit

Depending upon the DC sample, i.e., whether the sample is the high nibble of the tip signal sample or not, the framing bit is either a "1" or a "0". Specifically, the framing bit is a "0" whenever the DC sample transmitted is the high nibble of the tip signal sample; otherwise the framing bit is a "1". In this manner, a "0" is used as the framing bit once every six frames.

Once transmit interrupt routine 1100 generates an 8-bit data byte, the microcontroller instructs the digital interface to send the data byte to the channel bank for insertion into a T1 frame. After a complete 8-bit data byte is transmitted as a channel in a T1 frame, transmit interrupt routine 1100 returns, at step 1106, from the interrupt and continues execution of the MAIN LOOP routine from the point where the transmit interrupt routine interrupted the MAIN LOOP routine.

4. A/D Output Routines

Figure 12:
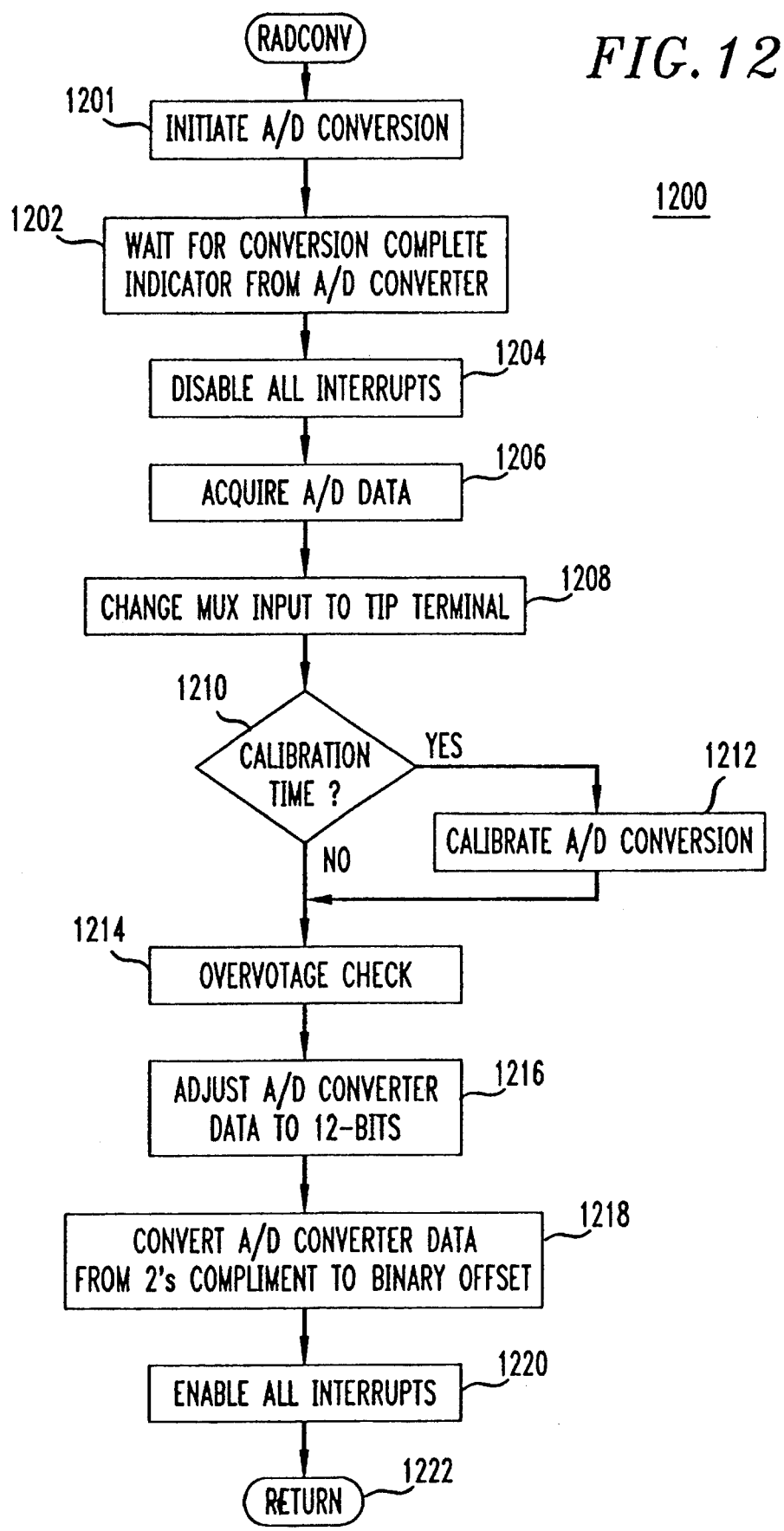
FIG. 12 depicts a flow chart of ring analog-to-digital converter output routine 1200 executing within microcontroller 322 shown in FIG. 3.

FIG. 12 is a flow chart of ring A/D converter output (RADCONV) routine 1200. At step 922 in the MAIN LOOP routine (FIG. 9), the MAIN LOOP routine executes the RADCONV. Though RADCONV is described herein before tip A/D converter output routine (TADCONV) 1300, RADCONV is actually executed after TADCONV. However, for ease of explanation, RADCONV is described first.

In general, RADCONV 1200 processes the 12-bit DC signal sample and periodically executes an A/D calibration routine. Specifically, the microcontroller initiates, at step 1201, an A/D conversion twice every 750 μsec to digitize the tip and ring signals. When the A/D converter receives an acquisition request from the microcontroller, there is a finite time, known as a conversion time of the A/D converter, before the sample of A/D data is ready for processing by the microcontroller. During the conversion time, the microcontroller must wait until the A/D converter is ready to supply the sample. This waiting period is shown as step 1202.

At step 1204, all interrupts are disabled to ensure that RADCONV 1200 is not interrupted by the receive or transmit interrupt routines during processing of the A/D data. At step 1206 the ring signal sample, i.e., the digitized ring signal, is acquired from the A/D converter output and stored in RAM. Once the ring signal sample is stored, the microcontroller switches, at step 1208, the input to the MUX from the ring terminal to the tip terminal in preparation for the next A/D conversion.

At step 1210, RADCONV 1200 queries whether an A/D calibration should be performed. The microcontroller generally performs an A/D calibration every 50 msec. Hence, if 50 msec has expired since the previous calibration, the query at step 1210 is answered positively. In particular, the illustrative A/D converter (National Semiconductor part ADC1251) contains an internal self-calibration process. Consequently, the microcontroller activates a particular pin on the A/D converter and the A/D converter automatically calibrates itself at step 1212. The microcontroller waits an allotted amount of time, e.g., 8.5 μsec, until the calibration process completes, then proceeds to the next step in the routine.

After A/D calibration or if it is not presently time to perform an A/D calibration, RADCONV 1200, at step 1214, checks the magnitude of the present ring signal sample to ensure that the ring signal sample is not greater than the output voltage capability of the far end driver. Specifically, the magnitude of the ring signal sample cannot be larger than 135 volts. If the magnitude is larger than 135 volts, step 1214 changes appropriate bits in the ring signal sample to produce a magnitude of exactly 135 volts.

The A/D converter actually produces 13-bits of data (a 13-bit sample): 12 magnitude bits and one sign bit. In that only 12 bits are used by the channel interface unit, the 13 bits are shifted, at step 1216, to remove the least significant bit in the 13-bit sample. The remaining 12 bits represent 11 bits of magnitude information and one bit of sign information. The remaining 12 bits which are in 2's compliment form are converted to unipolar binary code at step 1218. Before exiting RADCONV 1200, at step 1220, the interrupts are re-enabled. Lastly, having completed the conversion of the ring signal, the routine returns, at step 1222, to the MAIN LOOP routine.

Figure 13:
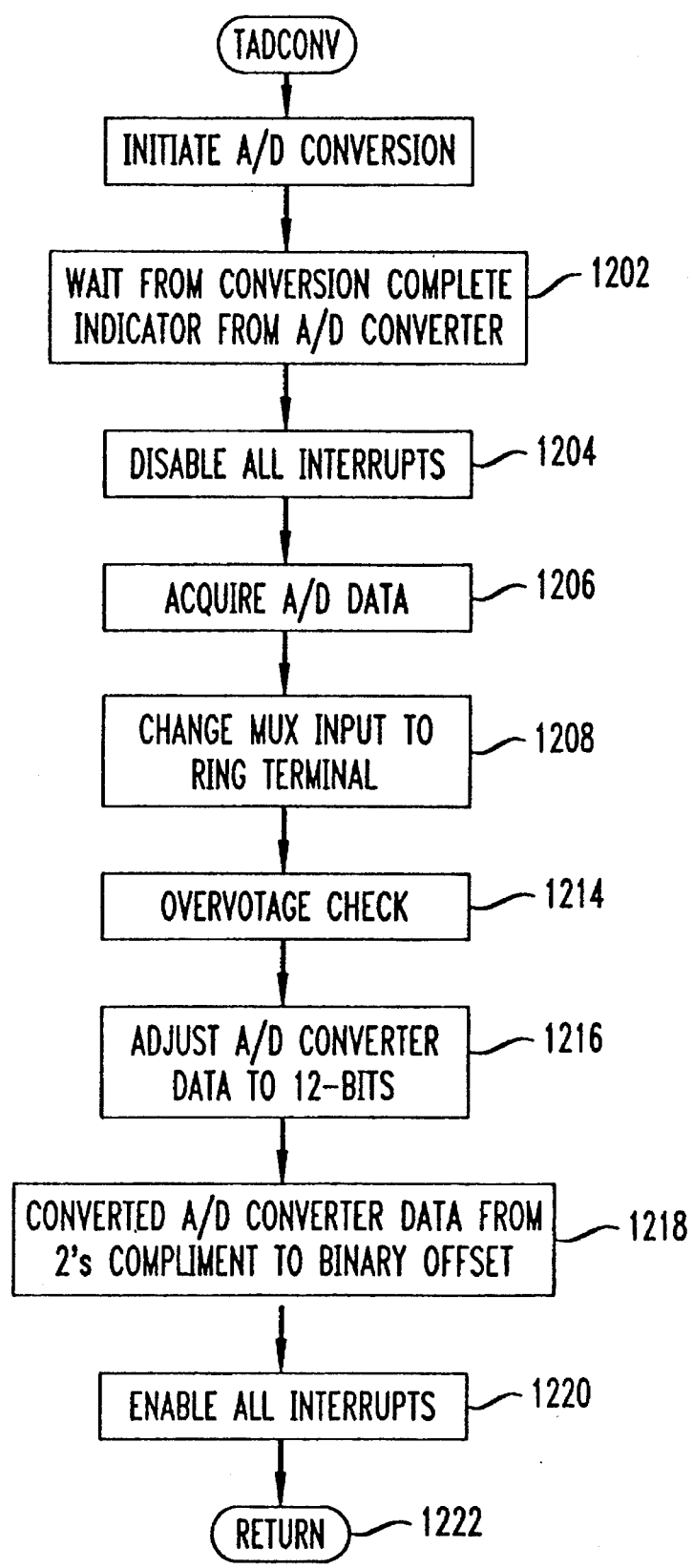
FIG. 13 depicts a flow chart of tip analog-to-digital converter output routine 1300 executing within microcontroller 322 shown in FIG. 3.

Similarly, the tip A/D output (TADCONV) routine 1300, depicted as a flow chart in FIG. 13, operates in the same manner as RADCONV 1200. The only difference is that the A/D calibration is only performed during the RADCONV routine. To clearly depict the parallels between the RADCONV routine and the TADCONV routine, the same reference numerals are used in FIG. 13 as are used in FIG. 12 to indicate identical routines. As such, after RADCONV produces a ring signal sample, TADCONV produces a tip signal sample. After the tip signal sample is generated, TADCONV routine 1300 returns, at step 1222, to the MAIN LOOP routine.

In this manner, upon alternating A/D conversions, a 12-bit tip signal sample and a 12-bit ring signal sample are produced each and every 750 μsec. Moreover, to inherently protect the far end driver circuitry from being requested to produce an excessive output voltage, both the RADCONV routine and the TADCONV routine contain overvoltage check subroutines to limit the tip and ring signal samples to ±135 volts.

5. 60 Hz Filter

When the channel interface unit must interface voice signals as well as DC signals to the T1 link, the channel interface unit is said to be operating in a voice mode. Detrimentally, the D/A converter produces an analog output at all times. Thus, when no digital signals representing DC signals are being received from the T1 link, the D/A converter produces noise which is, subsequently, amplified by the drivers and transmitted onto the tip and ring wires. This noise can distort voice signals on the tip and ring wires that are being digitized by the voice processing circuitry. As such, the voice signals are corrupted. To alleviate this noise problem, a noise filter is inserted between the D/A converter and the drivers to suppress D/A noise that is within the voice band (200 Hz–3.4 KHz). The noise filter is inserted whenever the channel interface unit operates in the voice mode. However, in a majority of applications for the channel interface unit, both DC signals and voice signals are simultaneously carried by the ring and tip wires. In these applications, the noise filter must be removed from the output of the D/A converter whenever a DC signal appears on either wire. If the noise filter is not removed, the speed of the D/A converter is significantly reduced.

The noise filters are removed from the output of the D/A converter whenever the DC level on either the tip or ring wires at the transmit end (far end) change by a pre-defined amount. Thus, by monitoring the magnitude of the ring and tip signal samples at the receive end (near end), i.e., prior to D/A conversion, the microcontroller can detect changes in the DC level of either signal. When either signal level changes by more than a pre-defined amount, e.g., approximately 1.5 volts, the microcontroller determines that a DC signal must be generated and that the noise filter must be removed to best track the changes in this DC signal level. The monitoring function is performed on the receive end (near end) of the system. Meaning that the tip and ring wires are sampled at the far end, those samples are transmitted to the near end where they are monitored for a change in the DC signal level at a point prior to the D/A converter. If a DC signal level change is found, the noise filters are removed from the near end circuitry to facilitate accurate D/A conversion.

However, the tip and ring wires typically carry significant 60 Hz noise which can trigger removal of the noise filters even though a DC shift has not occurred. To avoid such an error, a 60 Hz filter is used to digitally filter the tip and ring signal samples and monitor those signals for any change in DC level that is not a result of 60 Hz noise.

Figure 14B:
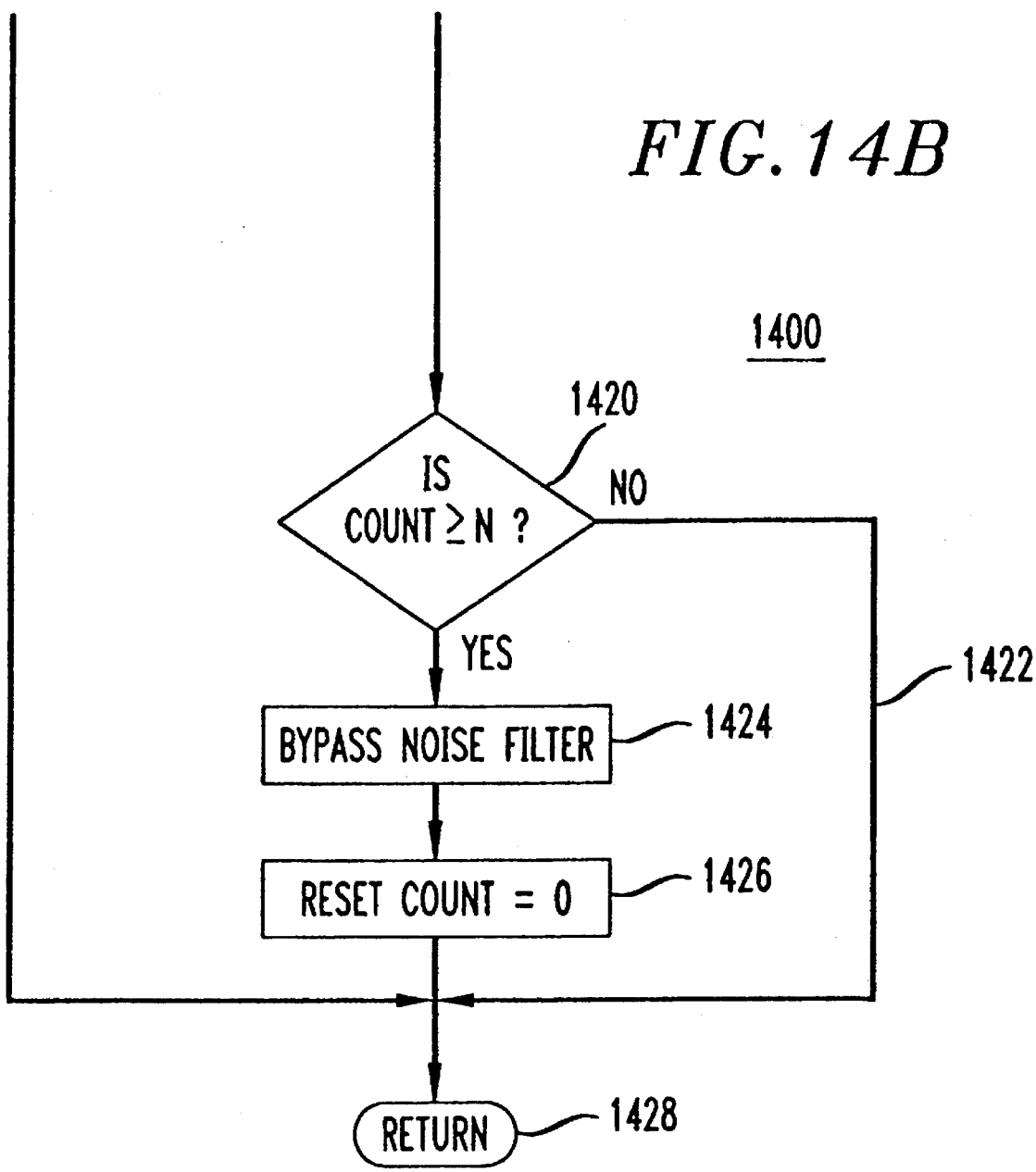

FIGS. 14A and 14B collectively together show a flow chart of tip 60 Hz filter routine 1400, for which the proper alignment of the drawing sheets for these figures is depicted in FIG. 14. Since the ring 60 Hz filter routine (not shown) is identical to tip 60 Hz filter routine 1400, only the tip routine is shown and discussed.

Routine 1400 is called from MAIN LOOP routine 900 (FIG. 9) and begins at step 1402 labeled "start". At step 1404, the tip 60 Hz filter routine sums eleven 12-bit magnitude samples of a tip signal received from the T1 link over a duration of 8.333 msec, e.g., one-half of a 60 Hz cycle. The routine assigns this sum the variable name $SUMA_1$. At steps 1406, 1408 and 1410, the magnitude sample summation is repeated for an additional three successive half cycle durations. The routine assigns the resultant sums from each step the variable names $SUMB_1$, $SUMA_2$, and $SUMB_2$, respectively. $SUMA_1$ and $SUMA_2$ represent durations equivalent to two consecutive half cycles having the same polarity, e.g., positive. Similarly, $SUMB_1$ and $SUMB_2$ represent durations equivalent to two consecutive half cycles having the same polarity, e.g., negative. At step 1412, $SUMA_2$ is subtracted from $SUMA_1$ to produce the difference quantity, $DIFF_A$. Similarly, $SUMB_2$ is subtracted from $SUMB_1$ to produce the difference quantity, $DIFF_B$. In this manner, each similar polarity half cycle duration is compared to a subsequent similar polarity half cycle duration. This subtraction removes any fluctuation on the tip wire which is caused by 60 Hz noise, i.e., the magnitude of 60 Hz noise should be constant for similar half cycles. As such, any difference, i.e., $DIFF_A$ or $DIFF_B$ larger than zero, represents a true DC shift in the signal and not a DC shift caused by 60 Hz noise.

However, small DC shifts can be generated by other noise sources, therefore, the difference values are compared, at step 1414, to a pre-defined threshold value, typically approximately 1.5V. If the difference values are not greater than the threshold, the routine follows path 1415 to the end of the routine and returns, at step 1429, to the MAIN LOOP. Consequently, when the MAIN LOOP enables routine 1400 upon the next pass through the MAIN LOOP, the next four 8.33 msec durations of samples are summed. Additionally, at step 1416, a counter (to be explained below) is reset to zero before routine 1400 returns to the MAIN LOOP routine. Alternatively, if, at step 1414, both difference values are greater than the threshold, a counter in incremented by 2 at step 1418. This counter maintains a count of the number of consecutive times the threshold is exceeded by both difference values. At step 1420, the routine queries whether the count has exceeded or is equal to a variable N, e.g., illustratively, N equals 30. If the count has not yet equaled or exceeded N, the routine continues along path 1422 to return, at step 1428, to the MAIN LOOP routine.

If, however, the count at step 1420 equals or exceeds N, the routine proceeds to step 1424. At step 1424, the routine deems that a significant DC shift, i.e., greater than the threshold and lasting longer than N 60 Hz half cycles, has occurred on the tip wire and that such a shift indicates a DC signal is present rather than noise. Accordingly, the noise filter at the tip signal output of the D/A converter (FIG. 3) is removed from the circuit. At step 1426, the counter is reset to zero. At step 1428, routine 1400 returns to the MAIN LOOP routine (FIG. 9).

D. Various Options and Applications of Our Invention

1. Mechanized Loop Testing

In addition to modeling a two-wire metallic pair, our invention can model a four-wire metallic pair such as that used by local telephone companies to perform mechanized loop testing. Traditionally, telephone companies have utilized a pair of two-wire transmission lines to communicate with and remotely test remotely located telephone lines or additional two-wire lines connected thereto. However, as with the two-wire application discussed above, it is advantageous to replace the four-wire metallic pair with a digital link. Our invention is capable of performing such a function.

Figure 15:
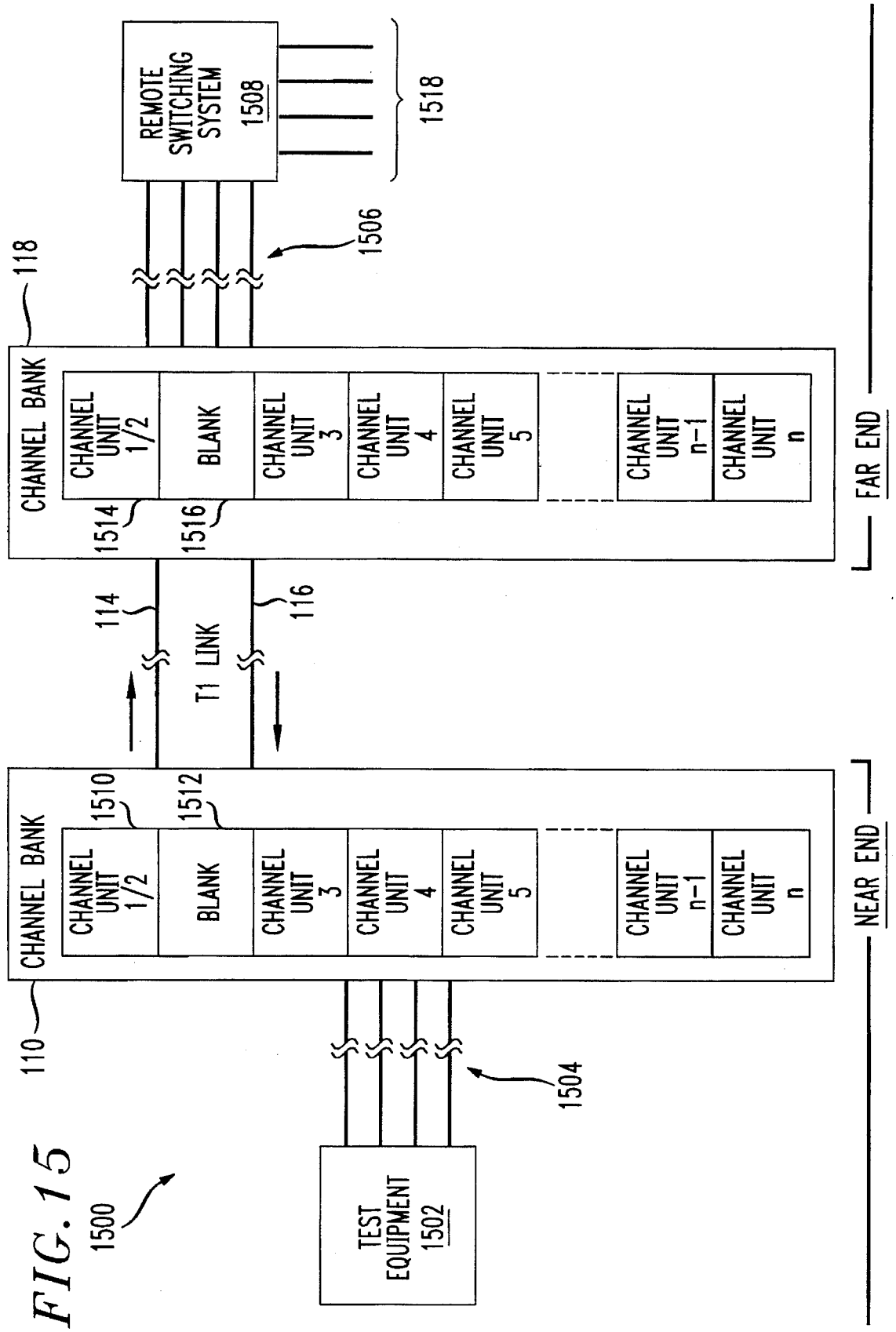
FIG. 15 depicts a high level block diagram of a pair of our inventive channel interface units 1510 and 1514 operating in mechanized loop testing (MLT) system 1500.

FIG. 15 depicts a high level block diagram of our inventive channel interface unit being used in mechanized loop testing system 1500. To facilitate modeling a four-wire connection between test equipment 1502 at the near end and remote switching system 1508 at the far end, two channel interface units are manufactured in such a manner as to fit onto a single circuit card in a channel bank slot. Illustratively, dual channel interface unit 1510 is inserted into channel bank 110 into slot 1; while slot 2 remains empty or blank as symbolized by reference number 1512. In this manner, each of the two channel interface units within dual units 1510 and 1514 will handle transmission of one pair of lines in four wire connection 1504 and 1506. Electrically, the foregoing discussion of the operation of a single channel interface unit applies here as well. Once a channel of data (8 bits) is properly formatted, channel bank 110 transmits the information from dual channel interface unit 1510 in one channel, e.g., channel 1. Subsequently, a second 8 bits of data is transmitted in an adjacent channel, e.g., channel 2, within a single frame in the T1 transmission format. In this manner, test equipment 1502 connects to remote switching system 1508 through a 128 Kbps (2×64 Kbps) digital transmission path. However, that transmission path is virtually transparent to the test equipment. As such, test equipment 1502 sends test signals to remote switching system 1508 to test various remote telephone lines 1518.

Of course, those skilled in the art will realize that the number of signals from respective wire pairs which can be transmitted through the digital link is not limited to two. By placing more channel interface units into a channel bank, any number of wire pairs can be utilized. For example, n channel interface units can be used to transmit signals from n wire pairs (where n is an arbitrary integer). In this manner, a T1 link would transmit signals at an n times 64 Kbps rate.

2. Transmit Only

In some applications for a channel interface unit, a given unit need only transmit information from one end of the communication system to the other, i.e., transmit only. For example, some alarm systems only transmit a signal from the far end to the near end when an event, such as a fire, is detected at the far end. In this kind of system, there is no requirement for the near end channel interface unit to transmit information. Therefore, a switch (illustratively switch 464 shown in FIG. 4B) is opened to disconnect both the tip and ring drivers from the tip and ring terminals. Thus, the output of each driver represents a high impedance to any signals on the respective wire pair connected thereto. Typically, the transmit only option is selected during installation of the channel interface unit into the channel bank.

3. Ground Simulation

In some alarm systems, the far end alarm detection circuitry is buffered from the tip and/or ring terminals by buffering devices such as opto-couplers. In such systems, a light emitting diode (LED) portion of the opto-coupler is connected to the alarm detection equipment. A photo-transistor (typically an NPN transistor) portion of the opto-coupler is connected between a power supply and either the tip or ring terminal. Specifically, a collector of the transistor is connected to the power supply and the emitter is connected to the tip or ring terminal. As such, when an alarm condition occurs, the LED portion illuminates the photo-transistor and turns the transistor on. Consequently, the positive potential is effectively connected through the photo-transistor to, for example, the tip terminal. At the near end, the tip terminal is connected through the alarm monitoring equipment to a return path which is, in this example, the ring wire. The ring wire is grounded within the far end alarm detection equipment. As such, to detect an alarm condition, the monitoring equipment merely detects the current flowing from the far end positive potential through the tip wire to ground, via the ring wire return path. In this manner, the cumulative impedance of the tip wire, ring wire and monitoring equipment operate as a pull down resistor, i.e., connecting the opto-coupler emitter to ground.

When a channel interface unit is utilized to replace, for example, the tip wire in an alarm system such as that described above, the channel interface unit at the far end must simulate the ground connection made through the ring wire. Accordingly, the channel interface unit at the far end maintains a fixed 0 volts at the output of both the tip and ring drivers. The output impedance of each driver simulates the two-wire transmission line impedance. Therefore, in the example using a NPN opto-coupler, the opto-coupler, when turned on, will source current to the tip driver, i.e., the tip driver sinks current from the photo-transistor through the driver output impedance. In this manner, the opto-coupler operates exactly as if it were connected to one wire in a two-wire transmission line.

The selection of the "ground simulation" mode of operation is accomplished by positioning one of the option selection switches in option selection switches 352 in FIG. 3. This switch causes the microcontroller to load the D/A buffers with 800 (HEX) which produces a zero volt output from D/A converter 328. Consequently, both drivers generate zero volt outputs. Thus, both drivers simulate a ground connection.

4. Voice/No Voice

In some alarm systems and other hardware systems, a voice band signal is not produced for transmission on a two-wire transmission path. When the channel interface unit is used in conjunction with such systems, a "no voice" option can be selected during installation of the channel interface unit into the channel bank. As shown in FIG. 3, a switch in option selection switches 352 selects either voice or no voice operation. When the switch is positioned in the no voice position, microcontroller 322 disables the ADPCM within analog voice processor 312. Consequently, the 3-bit voice data portion of the 8-bit byte transmitted in the T1 frame is maintained as "111". Additionally, in the no voice mode, noise filters 330 and 336 are bypassed by switches 332 and 334 and the microcontroller does not execute the 60 Hz filter routines.

5. Positive Feedback Within the Channel Interface Unit

FIG. 4B schematically depicts ring driver 346. This driver, as well as the tip driver, can be modified to increase the overall system speed in reflecting transient changes in signal levels at ring terminal 218. To facilitate increasing response speed of the system, a positive feedback circuit is incorporated into the driver. This circuit, shown having dashed circuit paths to exemplify its optional nature, comprises resistor 478 and capacitor 476 connected in series and forming a circuit path between the output of the driver and the positive terminal of operational amplifier 414. Additionally, resistor 480 and capacitor 482 are connected in parallel and form a path between the positive terminal of amplifier 414 and ground. Under normal use (no positive feedback) the positive terminal of amplifier 414 is connected to ground, therefore, to implement this optional circuit that path to ground must be broken as indicated by "X" 484. Typical values of these components are resistor 478 is 499k ohms, resistor 480 is 137k ohms, capacitor 476 is 0.0056 µF and capacitor 482 is 0.1 µF.

In operation, the positive feedback circuit samples the output of the driver and applies that sample to the positive input of the driver amplifier. As is well known in the art, such a positive feedback amplifier will tend to anticipate the future response of the system. However, this can lead to excessive overshoot of the actual future response or, in a worst case, system oscillation. However, by judiciously selecting the components that form the positive feedback circuit, the overall time required for the system to respond to a transitory change in signal levels on the ring wire is reduced. In effect, the positive feedback tends to begin changing the driver output signal level before the system has had time to send the present ring signal sample to the far end, D/A convert that signal sample, apply the signal to the far end load, digitize the response, and return the response to the channel interface unit at the near end. During this period, the positive feedback will have already adjusted the output of the driver to a new level that is nearer a desired level. As such, the driver, in response to the signal returned from the far end, will not have to adjust the signal level to any great degree. Thus, the channel interface unit quickly attains the final signal level and, many times, with far fewer A/D and D/A conversions than occur without such positive feedback.

Although various embodiments which incorporate the teachings of the present invention have been shown and described in detail herein, those skilled in the art can readily devise many other varied embodiments that still incorporate these teachings.

We claim:

1. In a communications system, a channel interface unit for interconnecting a two-wire transmitting means for propagating analog signals and a digital signal transmitting means for propagating digital signals, said channel interface unit comprising:

a digital interface connected to said digital signal transmitting means, said digital interface producing digital signals based on said digital signals propagated on said digital signal transmitting means;

a first converter connected to said digital interface means, for converting said digital signals produced by said digital interface into representative analog signals;

a filter connected to said first converter, said filter filtering noise produced by said first converter from said representative analog signals produced by said first converter to produce filtered analog signals;

a driver connected to said filter, said driver amplifying said filtered analog signals produced by the filter and providing said amplified analog signals onto said two-wire transmitting means;

a power supply connected to said driver and said first converter, said power supply providing regulated voltage to said driver; and a second converter connected between said two-wire transmitting means and said digital interface, said second converter converting said analog signals propagated on said two-wire transmitting means into digital signals for propagation on said digital signal transmitting means, wherein said second converter includes:

a first sampler for sampling analog signals propagating on said two-wire transmitting means to produce a 3-bit digital signal representing a high frequency component of said analog signals propagating on said two-wire transmitting means;

a second sampler for sampling analog signals propagating on said two-wire transmitting means to produce a 12-bit digital signal representing low frequency and DC components of said analog signals propagating on said two-wire transmitting means;

a parser for dividing said 12-bit digital signal into three 4-bit digital signals;

a framing bit generator for producing a framing bit; and an 8-bit data byte generator for producing an 8-bit data byte for propagation upon said digital signal transmitting means between said first and second channel interface units, wherein said 8-bit data byte contains said 3-bit digital signal, one of said three 4-bit digital signals and said framing bit.

2. The channel interface unit of claim 1 wherein said 8-bit data byte has the form:

XXX Y ZZZZ where:

X represents a high frequency data bit;

Y represents said framing bit; and

Z represents a low frequency and DC data bit.

3. In a communications system, a channel interface unit for interconnecting a two-wire transmitting means for propagating analog signals and a digital signal transmitting means for propagating digital signals, said channel interface unit comprising:

a digital interface connected to said digital signal transmitting means, said digital interface producing digital signals based on said digital signals propagated on said digital signal transmitting means;

a first converter connected to said digital interface means, for converting said digital signals produced by said digital interface into representative analog signals;

a filter connected to said first converter, said filter filtering noise produced by said first converter from said representative analog signals produced by said first converter to produce filtered analog signals;

a driver connected to said filter, said driver amplifying said filtered analog signals produced by the filter and providing said amplified analog signals onto said two-wire transmitting means;

a power supply connected to said driver and said first converter, said power supply providing regulated voltage to said driver;

a bypass path for bypassing, in response to a control signal, said filter such that said representative analog signals produced by said first converter are no longer filtered by said filter;

a detection device, connected to said digital interface, for detecting a DC component being represented in said digital signal;

a control signal generator, connected to said detection device, for generating, in response to an occurrence of said DC component, said control signal.

4. The channel interface unit of claim 3 wherein said detection device further comprises means for differentiating said DC component from a 60 Hz noise component of said digital signal.

5. The channel interface unit of claim 4 wherein said means for differentiating comprises:

means for summing said digital signals occurring during a time interval equivalent to one-half cycle of said 60 Hz noise and for producing four sums representing four consecutive time intervals;

means for determining a first difference between the first and third sums and determining a second difference between the second and fourth sums; and means for comparing said first difference and said second difference to a threshold value and generating said control signal to bypass said filter if said first and second differences exceed the threshold value.

6. The channel interface unit of claim 5 wherein said means for comparing comprises means for determining a total number of consecutive first and second differences occurring over a period of time and generating said control signal to bypass said filter if said total number of consecutive first and second differences exceeds a preset value.

7. In a channel interface unit for interconnecting a two-wire transmitting means for propagating analog signals and a digital signal transmitting means for propagating digital signals, wherein said channel interface unit contains a digital interface circuit, connected to said digital signal transmitting means, for producing digital signals based on digital signals received from said digital signal transmitting means; a digital-to-analog converter circuit for converting said digital signals produced by the digital interface circuit into representative analog signals; a driver circuit for amplifying said analog signals and applying said amplified analog signals to said two-wire transmitting means; and a power supply for providing a regulated voltage to said driver circuit, a method of reducing noise in said analog signal produced by said digital-to-analog converter circuit comprising the steps of:

filtering said analog signals produced by said digital-to-analog circuit;

detecting a DC component represented in said digital signals produced by said digital interface circuit;

generating, in response to said DC component, a control signal; and bypassing, in response to said control signal, said step of filtering such that said analog signals are no longer filtered.

8. The method of claim 7 further comprising the step of differentiating said DC component from a 60 Hz noise a component of said digital signal.

9. The method of claim 8 wherein said step of differentiating further comprises the sub-steps of:

summing said digital signals occurring during a time interval equivalent to one-half cycle of said 60 Hz noise;

producing four sums representing four consecutive time intervals;

determining a first difference between said first and third sums;

determining a second difference between said second and fourth sums;

comparing said first difference and said second difference to a threshold value; and generating said control signal to bypass said step of filtering if said first and second differences exceed the threshold value.

10. The method of claim 9 wherein said sub-step of comparing further comprises the steps of determining a total number of consecutive first and second differences occurring over a period of time and generating said control signal to bypass said step of filtering if said total number of consecutive first and second differences exceed a preset value.

11. A communications system having a first channel interface unit connected between a first two-wire transmitting means for propagating analog signals and a digital signal transmitting means for propagating digital signals and a second channel interface unit connected between said digital signal transmitting means and a second two-wire transmitting means for propagating analog signals, said first and second channel interface units comprising:

a first converter for sampling analog signals propagating on an associated one of said first and second two-wire transmitting means to produce a 3-bit digital signal representing a high frequency component of said analog signals;

a second converter for sampling analog signals propagating on the associated one of said first and second two-wire transmitting means to produce a 12-bit digital signal representing low frequency and DC components of said analog signals;

a parser for dividing said 12-bit digital signal into three 4-bit digital signals;

a framing bit generator for producing a framing bit; and an 8-bit data byte generator for generating an 8-bit data byte for propagation upon said digital signal transmitting means between said first and second channel interface units, wherein said 8-bit data byte contains said 3-bit digital signal, one of said three 4-bit digital signals and said framing bit.

12. The communications system of claim 11 wherein said 8-bit byte has the form:

XXX Y ZZZZ where:

X represents a high frequency data bit;

Y represents said framing bit; and

Z represents a low frequency or DC data bit.

13. The communications system of claim 11 wherein said channel interface units further comprise a digital interface for interfacing said 8-bit data byte generator with said digital signal transmitting means such that said 8-bit data byte is transmitted as one of a plurality of bytes contained in a frame.

14. The communications system of claim 13 wherein said digital interface means places one 8-bit data byte in each frame such that three frames containing three data bytes are used to transmit one analog signal sample.

15. The communications system of claim 11 further comprising:

a third two-wire transmitting means cooperatively associated with said first two-wire transmitting means such that said first and third two-wire transmitting means form a first four-wire transmitting means for propagating mechanized loop testing signals;

a fourth two-wire transmitting means cooperatively associated with said second two-wire transmitting means such that said second and fourth two-wire transmitting means form a second four-wire transmitting means for propagating mechanized loop testing signals;

a third channel interface unit cooperatively operating with said first channel interface unit to generate two sequential data bytes for propagation upon said digital signal transmitting means; and a fourth channel interface unit cooperatively operating with said second channel interface unit to generate two sequential data bytes for propagation upon said digital signal transmitting means, wherein said mechanized loop testing signals are propagated as 8-bit data bytes via said digital signal transmitting means between said third and first channel interface units and said second and fourth channel interface units.

16. A communications system capable of performing mechanized loop testing having a first pair of channel interface units connected between a first four-wire transmitting means for propagating mechanized loop testing signals and a digital signal transmitting means for propagating digital signals and a second pair of channel interface units connected between a second four-wire transmitting means for propagating mechanized loop testing signals and said digital signal transmitting means, each of said channel interface units comprising:

a first converter for sampling said mechanized loop testing signals to produce a 3-bit digital signal representing a high frequency component of said mechanized loop testing signals;

a second converter for sampling said mechanized loop testing signals to produce a 12-bit digital signal representing low frequency and DC components of said mechanized loop testing signals;

a parser, connected to said second means, for dividing said 12-bit digital signal into three 4-bit digital signals;

a framing bit generator for producing a framing bit; and an 8-bit data byte generator, connected to said first converter, said parser, and said framing bit generator, for generating an 8-bit data byte for propagation upon said digital signal transmitting means between said first and second pairs of channel interface units wherein said 8-bit data byte contains said 3-bit digital signal, one of said three 4-bit digital signals and said framing bit.

17. The communications system of claim 16 wherein said 8-bit byte has the form

XXX Y ZZZZ where:

X represents a high frequency data bit;

Y represents said framing bit; and

Z represents a low frequency or DC data bit.

18. The communications system of claim 16 wherein said channel interface units further comprise digital interface for interfacing said 8-bit data byte generator with said digital signal transmitting means such that said 8-bit data byte is transmitted as one of a plurality of bytes contained in a frame.

19. The communications system of claim 18 wherein said digital interface places one 8-bit data byte in each frame such that three frames containing three data bytes are used to transmit one analog signal sample from each of said channel interface units.

20. In a communications system having a first channel interface unit connected between a first two-wire transmitting means for propagating analog signals and a digital signal transmitting means for propagating signals and a second channel interface unit connected between said digital signal transmitting means and a second two-wire transmitting means for propagating analog signals, a method of converting said analog signals into digital signals for propagation between said first and second interface units, said method comprising steps of:

sampling analog signals propagating on said first two-wire transmitting means to produce a 3-bit digital signal representing a high frequency component of said analog signals;

sampling analog signals propagating on said first two-wire transmitting means to produce a 12-bit digital signal representing low frequency and DC components of said analog signals;

dividing said 12-bit digital signal into three 4-bit digital signals;

producing a framing bit; and generating an 8-bit data byte for propagation upon said digital signal transmitting means between said first and second channel interface units, wherein said 8-bit data byte contains said 3-bit digital signal, one of said three 4-bit digital signals and said framing bit.

21. The method of claim 20 wherein said 8-bit byte has the form:

XXX Y ZZZZ where:
X represents a high frequency data bit;
Y represents said framing bit; and
Z represents a low frequency or DC data bit.

22. The method of claim 21 further comprising a step of interfacing said 8-bit data byte with said digital signal transmitting means such that said 8-bit data byte is transmitted as one of a plurality of bytes contained in a frame.

23. The method of claim 22 wherein said step of interfacing places one 8-bit data byte in each frame such that three frames containing three data bytes are used to transmit one analog signal sample.

24. In a communications system capable of performing mechanized loop testing having a first pair of channel interface units connected between a first four-wire transmitting means for propagating mechanized loop testing signals and a digital signal transmitting means for propagating digital signals and a second pair of channel interface units connected between a second four-wire transmitting means for propagating mechanized loop testing signals and said digital signal transmitting means, a method of converting said mechanized loop testing signals into digital signals for propagation on said digital signal transmitting means, said method comprising steps of:

sampling said mechanized loop testing signals to produce two 3-bit digital signals representing a high frequency component of said mechanized loop testing signals;

sampling said mechanized loop testing signals to produce two 12-bit digital signals representing low frequency and DC components of said mechanized loop testing signals;

dividing said 12-bit digital signals into six 4-bit digital signals;

producing two framing bits; and generating two 8-bit data bytes for propagation upon said digital signal transmitting means between said first and second pairs of channel interface units wherein each of said two 8-bit data bytes contains one of said 3-bit digital signals, one of said six 4-bit digital signals and one of said framing bits.

25. The method of claim 24 further comprising a step of propagating said two 8-bit data bytes in two consecutive channels in a frame on said digital signal transmitting means.

26. A device for interfacing a two-wire analog transmission means for carrying a DC to low frequency analog signal and a voice frequency analog signal, with a digital transmission means for carrying digital signals, the device comprising:

a) a voice processor, the voice processor having a first input coupled with the two-wire analog transmission means, a second input for accepting a digital signal, an first output for providing a digital signal representative of a voice frequency analog signal based on a differential signal provided at its first input, and a second output providing an analog voice frequency signal based on the digital signal accepted at its second input;

b) an analog to digital converter having an input for accepting an analog signal and an output, the analog to digital converter providing a digital signal, based on the analog signal at its input, to its output;

c) a multiplexer having two inputs coupled with the two-wire analog transmission means, a control input, and an output coupled with the input of the analog to digital converter, the multiplexer selectively switching through one of its two inputs to its output based on a control signal provided at its control input;

d) a micro-controller having a first input coupled with the output of the analog to digital converter, a second input for receiving a digital signal, a first output, a second output, a control output coupled with the control input of the multiplexer, and a converter control output;

e) a digital interface unit having a first input coupled with the second output of the micro-controller, a second input coupled with the output of the voice processor, a third input coupled with the digital transmission means, a first output coupled with the second input of the micro-controller, a second output coupled with the second input of the voice processor, and a third output coupled with the digital transmission means, the digital interface (i) forming a frame of digital information for provision to its third output based on digital DC and low frequency data provided at its first input from the micro-controller and based on digital voice frequency data provided at its second input, (ii) parsing a frame of digital information received at its third input into digital DC and low frequency data and digital voice frequency data, and (iii) providing the digital DC and low frequency data to its first output and providing the voice frequency data to its second output;

f) a digital to analog converter having a data input coupled with the first output of the micro-controller, a control input coupled with the converter control output of the micro-controller, a first output providing a first analog signal based on a first group of digital data provided at its data input, and a second output providing a second analog signal based on a second group of digital data provided at its data input;

g) a first power supply having a first input coupled with the first output of the digital to analog converter and having an output carrying a first regulated supply voltage;

h) a second power supply having a first input coupled with the second output of the digital to analog converter and having an output carrying a second regulated supply voltage;

i) a first driver having a first input coupled with the output of the first power supply for receiving the first regulated supply voltage, a second input coupled with the first output of the digital to analog converter for receiving the first analog signal, a third input coupled with the second output of the voice processor for receiving analog voice frequency data, and an output, coupled with a first wire of the two-wire analog transmission means, for providing an output signal based on the signals applied to its inputs;

j) an inverter having an input coupled with the second output of the voice processor and having an output provided with an inverted signal of a signal supplied at its input; and k) a second driver having a first input coupled with the output of the second power supply for receiving the second regulated supply voltage, a second input coupled with the second output of the digital to analog converter for receiving the second analog signal, a third input coupled with the output of the inverter for receiving an inverted analog voice frequency signal, and an output, coupled with a second wire of the two-wire analog transmission means, for providing an output signal based on the signals applied to its inputs.

27. The device of claim 26 further comprising a switch arranged between first driver and the first wire of the two-line analog transmission means, wherein the switch has a closed state in which full-duplex communication is enabled and an opened state in which data can only be transmitted from the two-wire analog transmission means to the digital transmission means.

28. The device of claim 27 further comprising option switches coupled with the micro-controller.

29. The device of claim 28 wherein the switch includes a control input coupled with the micro-controller and wherein the state of the switch is controlled in response to a control signal provided by the micro-controller to the control input of the switch.

30. The device of claim 29 wherein the control signal provided to the control input of the switch from the micro-controller is based on a state of one of the option switches.

31. The channel interface unit of claim 1 wherein each generated eight-bit data byte includes a framing bit.

32. The channel interface unit of claim 1 wherein each generated eight-bit data byte includes three voice data bits.

* * * * *